United States Patent
Patil et al.

(10) Patent No.: US 9,723,464 B2
(45) Date of Patent: Aug. 1, 2017

(54) SYSTEM AND METHOD FOR IDENTIFYING A SERVICE MESH

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 14/515,400

(22) Filed: Oct. 15, 2014

(65) Prior Publication Data

US 2015/0109961 A1    Apr. 23, 2015

Related U.S. Application Data

(60) Provisional application No. 61/893,062, filed on Oct. 18, 2013.

(51) Int. Cl.

| | |
|---|---|
| *H04W 4/20* | (2009.01) |
| *H04W 8/00* | (2009.01) |
| *H04W 40/02* | (2009.01) |
| *H04W 48/10* | (2009.01) |
| *H04W 68/02* | (2009.01) |
| *H04W 72/00* | (2009.01) |
| *H04W 4/00* | (2009.01) |

(Continued)

(52) U.S. Cl.
CPC ............ *H04W 4/206* (2013.01); *H04L 67/04* (2013.01); *H04L 67/16* (2013.01); *H04L 67/30* (2013.01); *H04W 4/008* (2013.01); *H04W 8/005* (2013.01); *H04W 40/02* (2013.01); *H04W 48/10* (2013.01); *H04W 48/18* (2013.01); *H04W 48/20* (2013.01); *H04W 68/02* (2013.01); *H04W 72/005* (2013.01); *H04L 67/28* (2013.01); *H04W 84/18* (2013.01)

(58) Field of Classification Search
CPC ... H04W 4/206; H04W 40/24; H04W 40/244; H04W 40/246
See application file for complete search history.

(56) References Cited

U.S. PATENT DOCUMENTS

| | | | |
|---|---|---|---|
| 8,522,290 B2 * | 8/2013 | Chakrabarti | ........ H04L 65/4084 709/201 |
| 2010/0142447 A1 | 6/2010 | Schlicht et al. | |

(Continued)

OTHER PUBLICATIONS

International Search Report and Written Opinion—PCT/US2014/060887—ISA/EPO—Feb. 11, 2015.

(Continued)

*Primary Examiner* — Benjamin H Elliott, IV
*Assistant Examiner* — Kevin Lee
(74) *Attorney, Agent, or Firm* — Knobbe, Martens, Olson & Bear, LLP

(57) ABSTRACT

Systems and methods for receiving service data from a data path are disclosed. In one aspect, a method includes receiving a message from a neighbor aware network, and decoding the message to determine a communication channel used to provide a service, and an indicator of a paging window for the communication channel. In some aspects, the indicator of the paging window is based on synchronization information for a second communication channel.

18 Claims, 14 Drawing Sheets

(51) Int. Cl.
    *H04L 29/08*     (2006.01)
    *H04W 48/18*     (2009.01)
    *H04W 48/20*     (2009.01)
    *H04W 84/18*     (2009.01)

(56) References Cited

U.S. PATENT DOCUMENTS

| | | |
|---|---|---|
| 2011/0055326 A1 | 3/2011 | Michaelis et al. |
| 2011/0243553 A1* | 10/2011 | Russell .............. G06Q 30/0631<br>398/25 |
| 2012/0328061 A1 | 12/2012 | Chow |

OTHER PUBLICATIONS

Lenders V., et al., "Service Discovery in Mobile Ad Hoc Networks: A Field Theoretic Approach", World of Wireless Mobile and Multimedia Networks, 2005, WOWMOM 2005, Sixth IEEE International Symposium on a Taormina-Giardini Naxos, Italy Jun. 13-16, 2005, Piscataway, NJ, USA,IEEE, Los Alamitos, CA, USA, Jun. 13, 2005 (Jun. 13, 2005), pp. 120-130, XP010811072.

Sheu M. et al., "Wi Mesh Alliance Proposal; 11-05-0575-01-000s-wi-mesh-allianceproposal", IEEE Draft; 11-05-0575-01-000S-Wi-Mesh-Alliance-Proposal, IEEE-SA Mentor, Piscataway, NJ USA, vol. 802.11s, No. 1, Jul. 20, 2005 (Jul. 20, 2005), pp. 1-155, XP017689003.

* cited by examiner

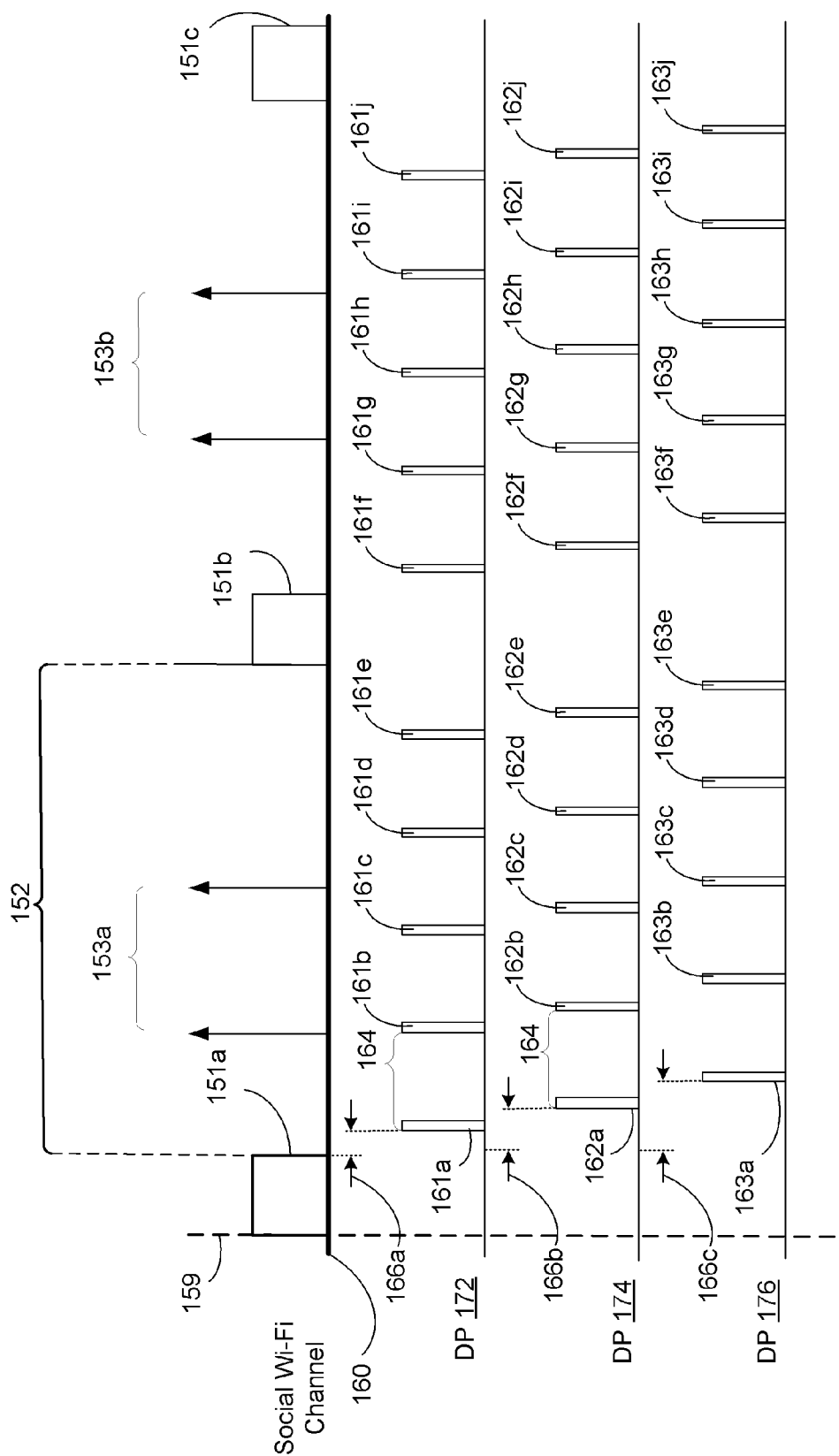

NAN Attribute Variables

| Field | Size | Value | Description |
|---|---|---|---|
| Attribute ID | 1 | TBD | Vendor-specific attribute ID |
| Length | 1 | Variable | |
| Mesh Network Key/Size | 4 | Variable | May distinguish two Mesh Networks having the same Mesh Network ID |
| Mesh Network Channel | 1 | Variable | Indicates the channel upon which the data network is operating |
| Mesh Network Control | 2 | Variable | See FIG. 3D for descriptions |
| Mesh Network ID | Variable (0-32) | Variable | Mesh Network group identifier |

FIG. 3C

Mesh Network Control Variables

| Bit(s) | Information | Description |
|---|---|---|
| 0 | Mesh Network Tx Repeat | Indicates if the Mesh Network Tx window repeats multiple times between consecutive DWs |
| 1-2 | DW Offset | Indicates when the mesh Tx window starts after DW |
| 3-4 | Mesh Network Tx Offset | Indicates the Tx window start time offsets between consecutive Mesh Network Tx windows |
| 5-6 | Mesh Network Tx Window Size | Indicates size of the Mesh Network Tx window |
| 7-8 | PW Size | Indicates size of the PW at the beginning of each Mesh Network Tx window. |
| 9-10 | Mesh Network Heartbeat | Indicates time for which the Mesh Network will remain alive absent a provider heartbeat |
| 11-15 | Reserved | -- |

FIG. 3D

SYSTEM AND METHOD FOR IDENTIFYING A SERVICE MESH

CROSS REFERENCE TO RELATED APPLICATIONS

This application claims priority under 35 U.S.C. §119(e) to U.S. Provisional Patent Application No. 61/893,062, filed Oct. 18, 2013, entitled "SYSTEM AND METHOD FOR IDENTIFYING A SERVICE MESH," which is hereby incorporated by reference in its entirety.

BACKGROUND

Technological Field

The present disclosure is generally related to neighbor-aware networking and more particularly to systems, methods, and devices for providing services over a neighbor-aware or social Wi-Fi network or networks.

Description of the Related Art

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

One or more devices in a wireless network may be configured to provide services. For example, a device may include hardware, such as a sensor, that is used to capture data. An application running on the device may then use the captured data to perform an operation. In some cases, the captured data may be useful to other devices in the wireless network. Some of the other devices in the wireless network may include similar hardware so as to capture similar data. Alternatively, the device could provide these services (e.g., the captured data) to one or more other devices in the wireless network. The device may inform the one or more other devices in the wireless network of the services that the device provides by advertising this information over the wireless network. Other devices may further advertise the services provided by a device to other devices not within range or capable of direct communication with the service provider.

SUMMARY OF THE INVENTION

One aspect disclosed is a method of utilizing a service provider device on a neighbor aware network (NAN) comprising at least a first mesh network, wherein each mesh network has at least a first multi-hop data path. The method may comprise receiving a first message at a first subscriber device of the NAN. The method may further comprise decoding the first message to determine whether a first service provider device of the first mesh network provides a first service, a communication channel on which the first service is provided, and at least one characteristic of a paging window for the communication channel.

Another aspect disclosed is an apparatus for utilizing a service provider on a neighbor aware network (NAN) comprising at least a first mesh network having at least a first multi-hop data path. The apparatus may comprise a receiver of the NAN configured to receive a first message. The apparatus may further comprise a processor configured to decode the first message to determine whether a first service provider device of the first mesh network provides a first service, a communication channel on which the first service is provided, and at least one characteristic of a paging window for the communication channel.

Another aspect disclosed is an apparatus for utilizing a service provider on a neighbor aware network (NAN) comprising at least a first mesh network having at least a first multi-hop data path. The apparatus may comprise means for receiving a first message of the NAN. The apparatus may further comprise means for decoding the first message to determine whether a first service provider device of the first mesh network provides a first service, a communication channel on which the first service is provided, and at least one characteristic of a paging window for the communication channel.

Another aspect disclosed is a non-transitory computer readable storage medium comprising instructions that when executed cause a processor to perform a method of utilizing a service provider on a neighbor aware network (NAN) comprising at least a first mesh network having at least a first multi-hop data path. The method may comprise receiving a first message at a first device of the NAN. The method may further comprise decoding the first message to determine whether a first service provider device of the first mesh network provides a first service, a communication channel on which the first service is provided, and at least one characteristic of a paging window for the communication channel.

Another aspect disclosed is a method for utilizing a service provider device on a neighbor aware network comprising at least a first mesh network, wherein each mesh network has a plurality of multi-hop data paths. The method may comprise generating, by a first device, a first message indicating a first service provider device of the first mesh network that provides a first service. The message may further indicate a first communication channel over which the first service is provided, and at least one characteristic of a paging window for the first communication channel. The method may further comprise transmitting, by the first device, the first message.

Another aspect disclosed is an apparatus for utilizing a service provider on a neighbor aware network (NAN) comprising at least a first mesh network, each mesh network having a plurality of multi-hop data paths. The apparatus may comprise a processor configured to generate a first message indicating a first service provider device of the first mesh network that can provide a first service, a first communication channel over which the first service is provided, and at least one characteristic of a paging window for the first communication channel. The processor may be further configured to transmit the first message.

Another aspect disclosed is an apparatus for utilizing a service provider on a neighbor aware network (NAN) comprising at least a first mesh network, each mesh network having a plurality of multi-hop data paths. The apparatus may comprise means for generating a first message indicating a first service provider device of the first mesh network that can provide a first service, a first communication channel over which the first service is provided, and at least one characteristic of a paging window for the first communication channel. The apparatus may further comprise means for transmitting the first message.

Another aspect disclosed is a non-transitory computer readable storage medium comprising instructions that when executed cause a processor to perform a method of providing a service on a neighbor aware network (NAN) comprising at least a first mesh network, each mesh network having a plurality of multi-hop data paths. The method may comprise generating, by a first device, a first message indicating a first service provider device of the first mesh network that provides a first service, a first communication channel over which the first service is provided, and at least one characteristic of a paging window for the first communication channel. The method may further comprise transmitting, by the first device, the first message.

BRIEF DESCRIPTION OF THE DRAWINGS

FIG. 1C is a timing diagram showing an example of paging windows for a plurality of mesh networks according to the disclosure.

FIG. 3C is a table of attribute body field characteristics of FIG. 3B.

FIG. 3D is a table of mesh network control variables according to FIG. 3A and FIG. 3B.

DETAILED DESCRIPTION

Figure 1A:
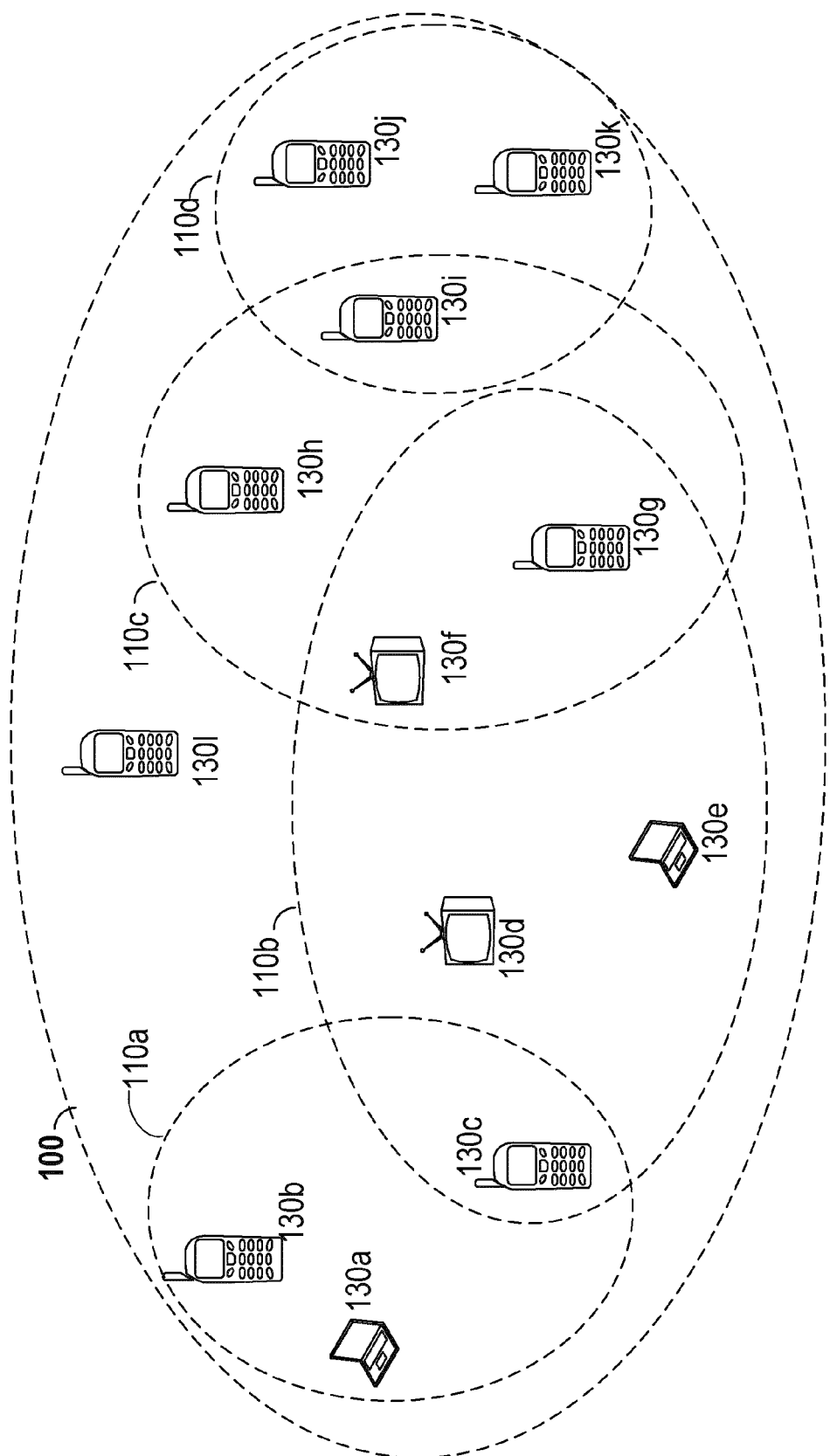
FIG. 1A illustrates an example of a neighbor aware network according to the disclosure.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method, which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol or the 802.11ac protocol using orthogonal frequency-division multiplexing (OFDM), direct-sequence spread spectrum (DSSS) communications, a combination of OFDM and DSSS communications, or other schemes. Implementations of the 802.11ah protocol or the 802.11ac protocol may be used for sensors, metering, and smart grid networks. Advantageously, aspects of certain devices implementing the 802.11ah protocol or the 802.11ac protocol may consume less power than devices implementing other wireless protocols, and/or may be used to transmit wireless signals across a relatively long range, for example about one kilometer or longer.

In some implementations, a WLAN includes various devices that are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol such as 802.11ah or 802.11ac) compliant wireless link to obtain general connectivity to the Internet or to other wide area networks. In some implementations an STA may also be used as an AP.

An AP may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A STA may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The 802.11s standard defines how wireless devices may communicate via mesh networks. Mesh networks may be used for static topologies and ad-hoc or neighbor aware networks (NAN). The terms "Social Wi-Fi," (SWF) and "NAN" may be used interchangeably herein. A network may comprise a plurality of mesh devices, each of which is capable of relaying data within the network on behalf of other mesh devices in a SWF environment. The data transmitted or relayed between the mesh devices may similarly create a data path ("DP") wherein the "path" describes the data flow from one mesh device to another. Accordingly, a SWF mesh may also be referred to as a NAN data path (NAN DP), comprising data transferred from a service provider to a service consumer, as described below. As described herein, a mesh may be generally referred to as comprising a plurality of DPs, although the two terms may be interchanged.

A NAN DP may include more than one "hop." A "hop" as used herein depends on the number of mesh devices between the device providing the service (provider device) and the device consuming the service or "subscribing" (subscriber device) to the service in the mesh network. For example, a service that is relayed by one mesh device may be referred to as two hops: provider STA (hop one) to proxy STA, (hop two) to seeker STA. While NAN may refer to a subset or network of devices capable of one-hop service discovery, a mesh network may be capable of service discovery and subscription over multiple hops (multi-hop). Accordingly, a NAN may comprise at least a first mesh network, and each mesh network may have at least a first multi-hop data path.

In certain embodiments, a "mesh network group" or a "DP group" may be used. A mesh network group may generally refer to a subset of a NAN cluster that shares a paging window (PW), described in connection with FIG. 1C, below. The PW for the mesh network group may have common security credentials for each of the mesh devices, which may serve to restrict membership within the mesh network. Accordingly, a restricted mesh network may require out-of-band credentialing.

Within the 802.11s standard, each participating device is expected to transmit beacon signals and cooperate in the distribution of data within the mesh network. The transmission of the beacons or "beaconing," helps providing functionality such as aiding synchronization between the mesh devices. Additionally, the beacons may also facilitate power saving by devices of the mesh network by including traffic indicator maps (TIMs) for devices within the mesh network.

To prevent beacon collisions between two different neighboring mesh devices 802.11s defines a mesh beacon collision avoidance (MBCA) architecture. To conform with the architecture, mesh devices offset their synchronization from neighbor mesh networks to avoid data collisions. Mesh devices may adjust a target beacon transmit time (TBTT) when collisions are detected. Methods are also provided in the standard to avoid collisions between one (1) and two (2) hop neighbors of the 802.11s network. The 802.11s protocol does not however particularly address how a mesh network may synchronize when within range of one or more additional mesh networks.

In some NANs, there may be multiple provider STAs providing a given service. Each provider STA may then attempt to create a separate mesh network for its own version of the service, consequently creating multiple mesh networks having the same service. This may present considerable redundancy in the presence of multiple SWF mesh networks or NAN DPs having the same service or services. Thus, consolidation to a single mesh network providing a single service may reduce overhead and redundancy. This may require the synchronization of the multiple SWF mesh networks.

Referring to FIG. 1A, a particular illustrative embodiment of a wireless network is depicted and generally designated 100. In some aspects, the wireless network 100 is a NAN. A NAN may also be referred to as an ad-hoc network in this disclosure. FIG. 1A illustrates wireless devices 130a-130l (collectively referred to herein as the "devices 130") are participating in the wireless network 100. For example, each of the devices 130 may receive beacon or other time synchronization information from one of the other devices 130 within the wireless network 100. This information may be received through a multi-hop data path as described above. In at least one aspect, one of wireless devices 130 may be designated as a "root" node for the wireless network 100, and therefore periodically transmit synchronization messages that are received by each of the other devices 130. For example, the device 130a may be the first device 130 to provide a first service, thus it may be the "root" device responsible for the synchronization messages within a particular mesh or data path, e.g., a mesh network 110a. Responsibilities as the root device 130 may change periodically as the membership of the network 100 changes. In some aspects, a portion of communication that occurs on the wireless network 100 may be performed on a standard communication channel, for example, channel 6 in some aspects. In some aspects, one or more of the wireless devices 130 may be considered stations (STA).

The synchronization information received over the wireless network 100 may indicate a discovery window (described in FIG. 1B) for the wireless network 100. The discovery window may be utilized by one or more of the wireless devices 130a-130l to perform service discovery operations. For example, a wireless device of wireless network 100 may broadcast or multicast a service discovery request message during the discovery window. The service discovery request message may indicate a request by a transmitting device to identify other devices on the wireless network 100 that can provide a service indicated in the service discovery request. The devices 130 may also respond to a discovery request during the discovery window. For example, if a device receives a discovery request for a service it can provide, the device may generate and transmit a response to the discovery request indicating one or more parameters associated with delivery of the service. These aspects are described more fully in connection with the following figures.

As shown, the wireless network 100 also may include four service mesh networks 110a-110d, referred to collectively as the "mesh networks 110." mesh networks may also be referred to herein as mesh networks or simply as "meshes." Each of the mesh networks 110 is shown including a portion of the wireless devices 130a-130k. The mesh network 110a includes wireless devices 130a-130c. The mesh network 110b includes wireless devices 130c-130g. The mesh network 110c includes wireless devices 130f-130i. The mesh network 110d includes wireless devices 130i-130k. As shown, the mobile device 130l is not currently included in any of mesh networks 110, however the device 130l may join a mesh network as needed to subscribe to a desired service. In certain embodiments, each of the mesh networks 110 may be formed according to the service or services provided by the members (devices 130) of the respective mesh networks 110. In certain embodiments, each mesh network 110 may include a plurality of multi-hop data paths among the devices 130.

Communication within each of the mesh networks 110 may be performed on a different communication channel than other communication for wireless network 100. For example, each of mesh networks 110 may operate on a different communication channel, which is also different than the channel used to perform communication for the network 100.

Each of the mesh networks 110 may be utilized by one or more "provider devices" to provide a service to other member devices of the mesh networks 110. For example, the mobile device 130a may be a service providing device (provider device) for the mesh network 110a, which, in one example, provides a music service to wireless devices 130b-130c. The mobile device 130a may advertise the service being provided on the mesh network 110a to devices on wireless network 100. For example, mobile device 130a (or other provider devices on wireless network 100) may broadcast or multicast a message over the wireless network 100 indicating a service that can be provided and one or more parameters associated with obtaining the service. In addition, a provider device on wireless network 100 may respond to service discovery requests received from other potential subscriber devices on the wireless network 100 as described above. For example, provider device 130a may transmit a discovery response that includes information indicating the service being provided in the mesh network 110a.

Similarly, each of the mesh networks 110b-110d may also comprise a respective provider device that may operate similarly to the example of provider device 130a provided above. For example, the mobile device 130d may be the provider device 130d for mesh network 110b, offering a video game service to mobile devices 130c, 130e, 130f, and 130g. The mobile device 130h may be a provider device 130h for the mesh network 110c by providing a picture sharing service to mobile devices 130f, 130g, and 130i. Similarly, mobile device 110j (provider device 130j) may provide a video service over the mesh network 110d to mobile devices 130i and 130k. Accordingly, each of the mobile devices 130 that consumes or subscribes to the services of a given provider device (e.g., provider devices 130a, 130b, 130d, 130h, 130j) may also be referred to as a subscriber device 130. More particularly, in view of the provider devices 130a, 130b, 130d, 130h, 130j noted above, a "subscriber device 130" may generally refer to the subscriber devices 130c, 130e, 130f, 130g, 130i. However, in certain aspects, a mobile device 130a-130k may be classified as either a "provider device" or a "subscriber device" depending on the service architecture.

A given mobile device may be a member of two or more mesh networks 110 concurrently and therefore receive services provided by each of the provider devices 130 of the respective mesh networks. For example, the mobile device 130c is shown as a member of both mesh networks 110a and 110b. Thus, mobile device 130c may be concurrently receiving the music services provided by mobile device 130a and image services provided by mobile device 130d. Similarly, mobile devices 130f-g participate in mesh networks 110b and 110c, and mobile device 130i participates in both mesh networks 110c and 110d.

FIG. 1A illustrates that a wireless device providing a service over one mesh network may also receive services over a second mesh network. For example, in FIG. 1C, the mobile device 130c is receiving music services via mesh network 110a while providing a video game service to mobile devices 130d-g.

In an embodiment, a single mobile device 130 may provide multiple services to multiple mesh networks. For example, mobile device 130c may provide a service for music on mesh network 110a to mobile devices 130a-b while simultaneously providing a service for video games on mesh network 110b to mobile devices 130d-g.

The need to synchronize individual mesh networks in 802.11s may result in a large volume of beacon and synchronization traffic within an 802.11s network, especially a network including a large number of mesh networks. This large amount of traffic also results in computational overhead for each device that is a member of the network and one or more mesh networks.

To reduce the amount of overhead associated with synchronizing multiple mesh networks within a social Wi-Fi network, the methods, apparatus, and systems disclosed herein propose the use of a first social Wi-Fi network to provide synchronization for members of the network. With this approach, separate beaconing and synchronization for mesh networks is not required. Instead, the mesh networks may be synchronized based on synchronization information for the first social Wi-Fi network. In an 802.11s network, beacons help in identifying a network and its capabilities. Since the proposed methods, apparatus, and systems may not include beacons on the mesh channel, they may utilize additional parameters in Social Wi-Fi messages—for example, to include a mesh ID, channel etc. Moreover, additional parameters exchanged during peering may help identify the capabilities of each mesh peer. The various signals and their implementation are described below in connection with FIG. 1B-FIG. 1D and FIG. 3A-FIG. 3E FIG. 1B depicts an illustrative embodiment of a NAN according to the disclosure. As shown, a plurality of devices within a cluster 170 are participating in the SWF NAN. The cluster 170, or SWF NAN, shown in this figure may be similar to the wireless network 100 (FIG. 1A). The plurality of devices within the cluster 170 may further be similar to the devices 130. In an embodiment, each of the devices within the cluster 170 may be using a service or services offered by the members of the NAN as a whole. In some other embodiments, the service(s) may also be delineated by smaller groups within the cluster 170. The smaller groups may be referred to herein as mesh networks: a mesh network 172, a mesh network 174, or a mesh network 176. Accordingly, a given NAN (e.g., the cluster 170) may comprise multiple meshes, or mesh networks as described herein. Each of the mesh networks 172, 174, 176 may include a plurality of multi-hop data paths among the devices, as depicted in the figure. Each of the respective meshes (the mesh network 172, the mesh network 174, and the mesh network 176) may comprise a common service, a common operating system, a common platform (e.g., a particular brand of smartphone, or computer), or other relevant commonality. Each of the mesh networks 172, 174, 176 may then comprise an individual mesh network. As a non-limiting example, the mesh network 172 may form a SWF mesh for transport of data, while the mesh network 174 may utilize GPS services, video/photo sharing, or online gaming features.

In an embodiment, the cluster 170 and the mesh networks 172, 174, 176 may each be capable of supporting multiple services each. Within each NAN, or within each of the mesh networks 172, 174, 176 (within the NAN), each device may become a proxy for services provided by the respective mesh network or NAN. In an embodiment, where a mesh (e.g., the mesh networks 172, 174, 176) supports one or more services, all of the devices 130 participating in the mesh network may proxy the mesh services (e.g., all of the services provided by the mesh) regardless of whether the individual proxy STA is actually consuming the service.

In an embodiment, a further abstraction may be implemented, delineating what particular applications 180 might be supported by a particular mesh network. In an embodiment, the STAs that are part of the mesh networks 172, 174, 176 (i.e., participating in the respective Social Wi-Fi mesh) may normally act as a proxy for service discovery packets (as described above) for all the services supported by the mesh network, while also forwarding the data associated with the services supported by the particular mesh network 172, 174, 176. Therefore each mesh may comprise a plurality of STAs that consume and/or proxy one or more of the mesh's services.

As a non-limiting example, the device 130 (e.g., the device 130e of FIG. 1A) seeking a particular service may join the network 100, seeking a particular service (e.g., GPS or a game). The device 130e may discover multiple mesh networks 172, 174, 176 within the cluster 170 (or the network 100). The device 130e may further discover multiple services within each of the mesh networks. For example, the applications 180a, 180b are provided by the mesh network 172 and the applications 180c-180e provided by mesh network 174. The device 130e joining the network 100 may also encounter multiple provider devices (discussed below) or multiple instances of the same service within the given mesh network 172, 174, 176.

As described in the following figures, standard messaging, signals, beacons, and timing may provide the device 130e efficient methods to join and operate within a mesh network network 100 having multiple providers or multiple instances of the same service. Such signaling is necessary to allow a device (e.g., the device 130b) seeking a service to find and communicate with a root or master device providing a service (e.g., the device 130a) within a mesh network 172, 174, 176.

Figure 1B:
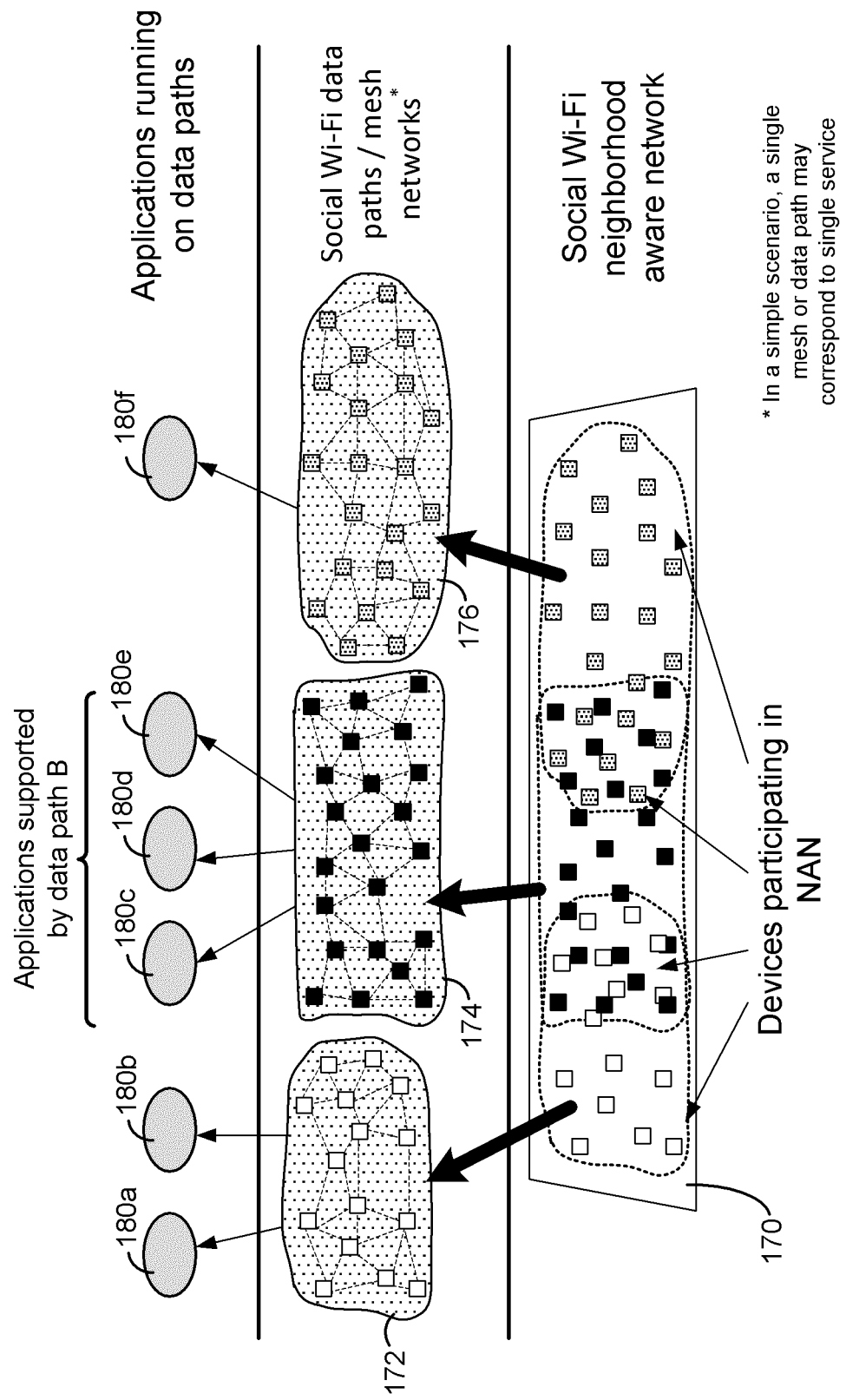
FIG. 1B depicts an illustrative embodiment of a neighbor aware network having multiple mesh networks in accordance with the disclosure.

FIG. 1C is a timing diagram depicting various data transmissions within a social Wi-Fi (SWF) channel 160. The SWF channel 160 may be a channel on which the network 100 (FIG. 1A) operates, for instance. Time extends along the horizontal axis to the right from an origin 159. The SWF channel 160 may comprise a plurality of mesh networks. As shown, the SWF channel 160 comprises data transmissions of three individual mesh networks 172, 174, 176 (FIG. 1B). Each of the mesh networks 172, 174, 176 may be substantially similar to one or more of the mesh networks 110 (FIG. 1A). Each of the mesh networks 172, 174, 176 is shown in reference to an individual timeline depicting series of paging windows 161, 162, and 163. In an embodiment, all three mesh networks 172, 174, 176 operate within the SWF channel 160. FIG. 1C further shows a periodic discovery window 151 (pictured as discovery windows 151a-151c) on the SWF channel 160. The discovery windows 151 indicates a time in which the social Wi-Fi channel 160 may be discovered by a wireless device. In an embodiment, each discovery window 151 is separated by a fixed period of time, or discovery interval 152. The discovery interval 152 may be determined by a root, or master device of the individual mesh network. This may be similar to the device 130a, above. Information regarding the timing of multiple periodic discovery beacons 153a and 153b may also be transmitted on the social Wi-Fi channel 160.

FIG. 1C further illustrates the plurality of paging windows 161a, 162a, and 163a for the three separate mesh networks 172, 174, 176. The paging windows 161, 162, 163 may be referred to collectively herein as "paging windows 161*" for simplicity. As shown, paging intervals 164 may denote a repeating time period during which a paging message is sent for each of the mesh networks 172, 174, 176. It should be noted that the individual paging windows 161* do not overlap. Each is spaced according to certain offsets.

In some aspects, the timing of the paging windows 161* for each mesh network 172, 174, 176 may be based on a page window offset 166 (shown as time offset 166a-166c) measured from end of the discovery windows 151 on the social Wi-Fi channel 160. Each of the paging windows 161* may have its own page window offset 166a-166c from the discovery window 151, as shown. Subsequent paging windows 161b-161n (where n is the paging window number) in the mesh network 172 for instance, may be transmitted based on the paging interval 164. The page window offset 166 defining the start of each paging window 161 may be a multiple of the paging window size, or duration to prevent overlap of the paging windows 161, 162, and 163 for the different service mesh networks 172, 174, 176. Accordingly, each of the time offsets 166a, 166b, and 166c may be different durations, selected at random or delineated by a given standard.

In some aspects, the discovery window interval 152 may be divided into a number of substantially evenly spaced paging intervals. For example, if the discovery interval 152 is 500 ms, placing the discovery windows 151a and 151b 500 milliseconds (ms) apart, the discovery window interval 152 may first be divided into five paging intervals of 100 ms each (not shown). Alternatively, the discovery interval 152 may be divided into two paging intervals of 250 ms each. The paging window offset 166 may then indicate when a subsequent paging window 161 occurs within each paging interval 164. For example, if there are five paging intervals between each discovery window, a paging window offset 166 of 5 ms will provide paging windows for a given mesh network (e.g., mesh network 172) at 5 ms, 105 ms, 205, 305, 405 ms after the start of the discovery window in one aspect.

In various aspects, the duration of a paging window 161* may be statically defined or dynamically determined based on a total number of mesh networks (e.g., three, as shown) operating with the neighbor aware network. When the duration of a paging window is statically defined, the number of paging windows within each discovery window interval may vary. For example, a neighbor aware network supporting a small number of mesh networks with a single social Wi-Fi network for synchronization may provide more separate paging windows in each discovery window interval than a neighbor aware network supporting a larger number of mesh networks.

Other aspects may dynamically vary the paging window duration based on the number of mesh networks currently supported. For example, a NAN supporting a small number of mesh networks and a single social Wi-Fi network for synchronization may provide for paging windows 161* of a longer duration than a neighbor aware network supporting a larger number of mesh networks (e.g., the mesh networks 172, 174, 176).

Wireless devices participating in a particular mesh network may be configured to be awake and listening for buffered data indications during the paging windows 161* defined for the three mesh networks 172, 174, 176 if they are a member of each particular mesh network. Because each mesh network 172, 174, 176 within the first SWF network has a unique paging window 161*, a device 130 that is a member of multiple mesh networks can listen for traffic and/or provide buffered traffic indications during each of the paging windows 161* for the mesh networks 172, 174, 176 of which it is a member.

Figure 1D:
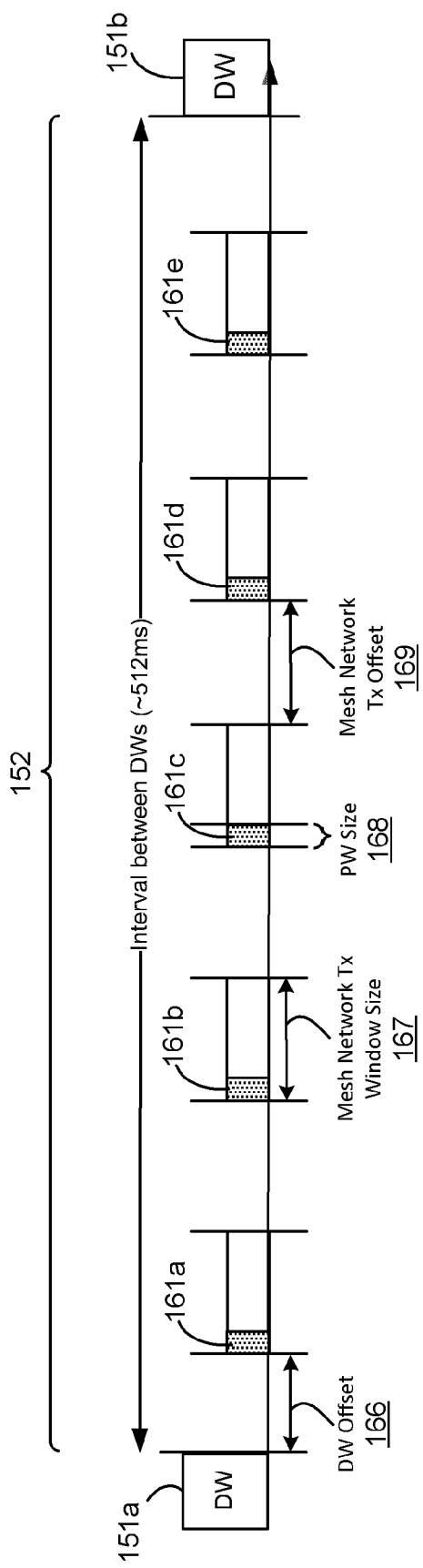
FIG. 1D is a timing diagram showing an example of several mesh network transmissions during a discovery interval according to the disclosure.

FIG. 1D depicts a portion of the timing diagram of FIG. 1C, representative of the discovery interval 152 for a single mesh network (e.g., the mesh network 172). As shown, the discovery interval 152 falls between the discovery window 151*a* and the discovery window 151*b*, also shown in FIG. 1C. A discovery window offset 166 indicates the amount of time before a paging window may be started following the end of the discovery window 151*a*. The interval may repeat, as noted above. A mesh network transmission (mesh network Tx) window size 167 may define the duration for which the mesh network transmission is scheduled. A paging window (PW) size 168 may further be defined, indicating the duration of the PW. A mesh network Tx offset 169 may further be defined in order to sequence transmissions and avoid data collisions.

Each of the durations shown in FIG. 1D are further described below in connection with FIG. 3A-3D and may be implemented in one or more embodiments to coordinate communication and data transfer on the channel 160.

Figure 1E:
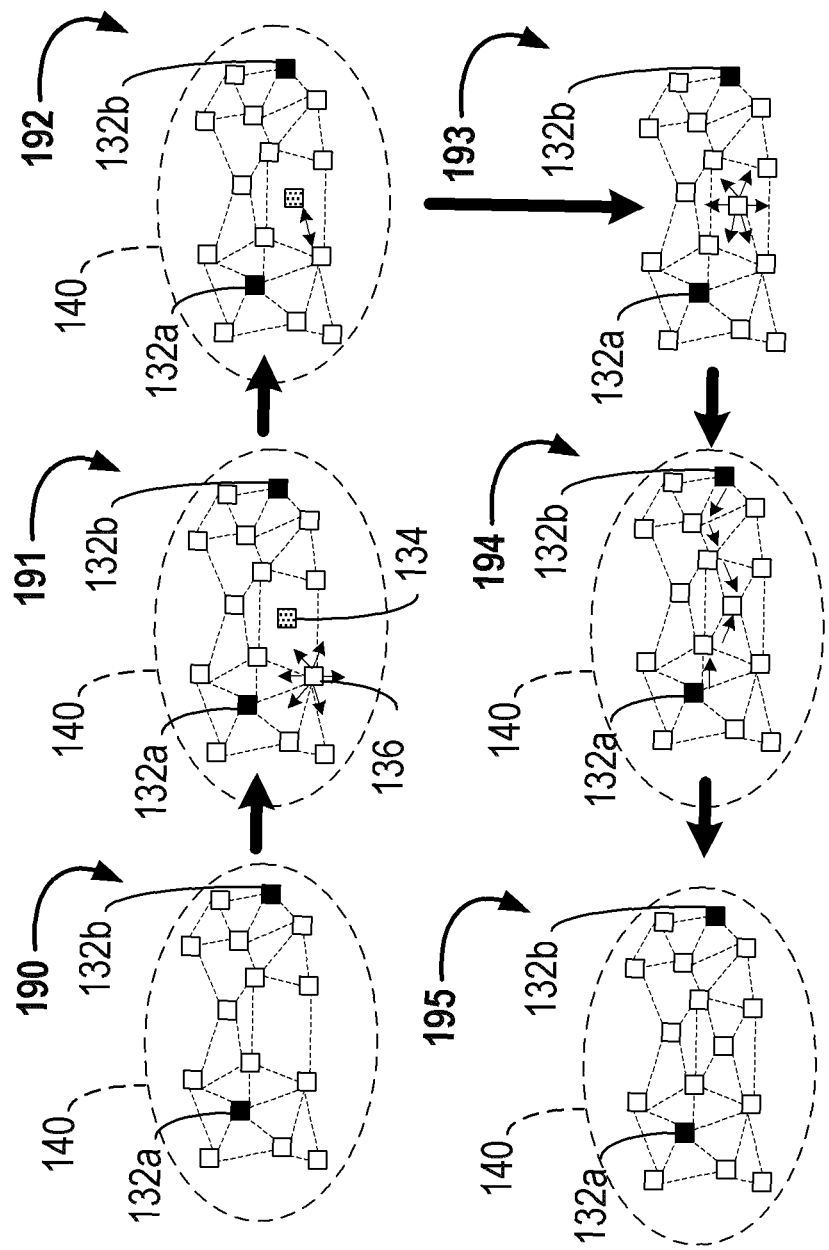
FIG. 1E is a flowchart depicting a wireless device joining a mesh network in accordance with the disclosure.

FIG. 1E is a flowchart depicting a device as it joins a mesh network, according to the disclosure. As shown in topology 190, a mesh network 140 may have two provider devices 132*a*, 132*b* (collectively, provider devices 132). The provider devices 132 may be similar to the devices 130 of FIG. 1A and the mesh network 140 may be similar to the mesh networks 110. In the topology 190, the existing mesh network 140 may be operating with a plurality of devices comprising the mesh network 140. The devices may be subscriber devices similar to the device 130 of FIG. 1A. Accordingly, each mesh network 140 may include a plurality of multi-hop data paths among the devices as depicted in the figure (e.g., dotted lines among the devices).

In topology 191, a new device 134 may receive certain service announcements or beacon transmissions (indicating a paging window and discovery window information) from other members of the mesh network 140, such as a device 136. The device 136 may transmit a service broadcast, beacon, or other signal indicating the details of the service(s) offered within the mesh network 140. The service advertisement may indicate specific timing and other information required by the new device 134 to join the mesh network 140. The specific information may correspond to the timing diagram of FIG. 1C. Frame formats and details are described below in connection with FIG. 3A-3D. The new device 134 may receive the service broadcast from the device 136 as shown by the arrows from the device 136.

In topology 192, the new device 134 may be seeking the service(s) offered by the mesh network 140 and may authenticate with the device 136 following receipt of the service advertisement in topology 191. Once the new device 134 may successfully associate with the mesh network 140 it may adjust its synchronization (see FIG. 1D). It should be noted that the device 136 is not necessarily a provider device 132, but a proxy device that may relay messaging and data to and from the provider devices 132.

In topology 193, the new device 134 may then initiate a route discovery in order to reach the provider devices 132. The new device 134 may receive routing messages from other devices within the mesh network 140, allowing the new device 134 to determine what the best content delivery path may be through the plurality of devices within the mesh network 140.

In topology 194, the signaling among the member devices within the routes from the provider devices 132 (e.g., the two routes indicated by the arrows) may assist the new device in establishing content delivery paths.

In topology 195, the new device 134 may become an active member of the mesh network 140 and assist as a proxy device to deliver content to other members of the mesh network 140 not directly connected with the provider devices 132.

Figure 2:
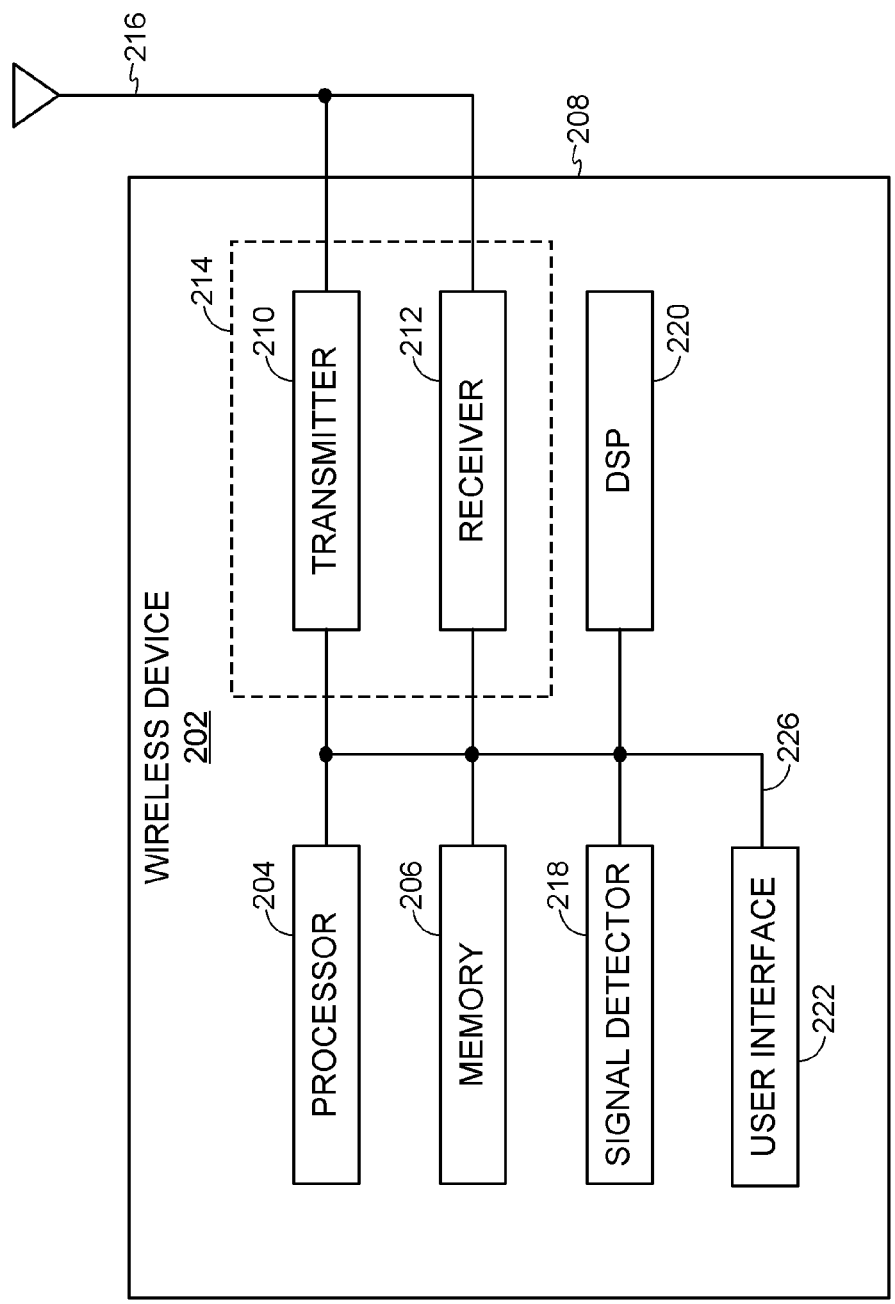
FIG. 2 illustrates an exemplary embodiment of a wireless device of one or more of the mobile devices of FIG. 1A according to the disclosure.

FIG. 2 shows an exemplary functional block diagram of a wireless device 202 that may be employed within the wireless network 100 of FIG. 1C. The wireless device 202 is an example of a device that may be configured to implement the various methods described herein. For example, the wireless device 202 may comprise one of the stations 130*a*-1.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise any of wireless devices 130a-1, and may be used to transmit and/or receive communications. That is, any of wireless devices 130a-1 may serve as transmitter or receiver devices. Certain aspects contemplate signal detector 218 being used by software running on memory 206 and processor 204 to detect the presence of a transmitter or receiver.

As described above, a wireless device, such as wireless device 202, may be configured to provide services within a wireless communication system, such as the wireless communication system 100. For example, the wireless device 202 may include hardware (e.g., a sensor, a global positioning system (GPS), etc.) that is used to capture or calculate data (e.g., sensor measurements, location coordinates, etc.).

As discussed in the following figures, the disclosed methods and systems extend the capabilities of existing social Wi-Fi frameworks such as wireless network 100 to enable participating devices, such as mobile devices 130, to perform multi-hop service discovery and establish mesh connectivity for content delivery. To accomplish this, a set of parameters used to establish mesh connectivity between the mobile devices 130 may be defined, and is discussed below with respect to FIG. 3. In some aspects, this set of parameters may be multicast or broadcast over the NAN, being included in one or more of the beacon transmissions, service advertisements, or other similar transmissions that may apprise a mobile device 130 of services available from a given mesh network 110.

In an embodiment, these broadcast or multicast messages may, in some aspects, use existing service discovery message formats for the first social Wi-Fi channel 160 as discussed above. The service discovery message formats are augmented by the methods, systems, and apparatus disclosed herein to provide for communication of the additional parameters that define one or more service mesh networks 110. Thus, while social Wi-Fi standards may provide for service discovery, they may not provide for post discovery connectivity between the devices 130 and mesh networks 110. For example, they may not provide for the delivery of services (such as service data), to one or more devices on the neighbor aware network. The disclosed methods, systems, and apparatus augment existing social Wi-Fi protocols to provide for both service discovery and service delivery.

Once the mesh connectivity is established by participating mobile devices 130, the service may be delivered over the mesh network. In some aspects, a device 130 may subscribe to multiple mesh networks, as noted above to provide for the delivery of multiple services to the device (e.g., mobile devices 130c, 130f). Similarly, the devices 130 may subscribe to more than one service and thus be members of more than one mesh network or mesh network group. Therefore, connectivity attributed for a given mesh network or multiple mesh networks may be advertised on a per-service basis. The signaling associated with such advertisements may be substantially similar to the methods and systems described in FIG. 1A, FIG. 1B, and the following figures.

In some aspects, more than one device may advertise similar services. This may result in two disparate sets of devices communicating over two distinct service meshes or mesh networks, both essentially providing the same service. These somewhat duplicative mesh networks may result in operational inefficiencies in some cases. Therefore, it may be desirable in some aspects to facilitate merging of two or more mesh networks that are providing substantially similar services. For instance, if mesh network 110a and mesh network 110d provided the same service, it may be beneficial to merge the two mesh networks into a single mesh network (not shown).

The methods and systems disclosed herein may utilize one or more communication parameters that function to define a mesh network utilized to provide a particular service. These parameters assist a participating mobile device 130 in identifying and connecting to the appropriate mesh network 110 for service delivery. These communication parameters may uniquely identify a mesh initiator. A mesh initiator may be a mobile device 130 (e.g., provider device 130a) having an available service sought by another mobile device, such as the subscriber devices 130b, 130c, as noted above.

In network environments that include at least two or more mesh networks 110 providing the same service, the parameters may facilitate merging of the two or more mesh networks into one large mesh network. By merging the two or more mesh networks into one mesh network such as the mesh networks 110 of FIG. 1C, operational efficiencies may be achieved in some aspects.

Figure 3A:
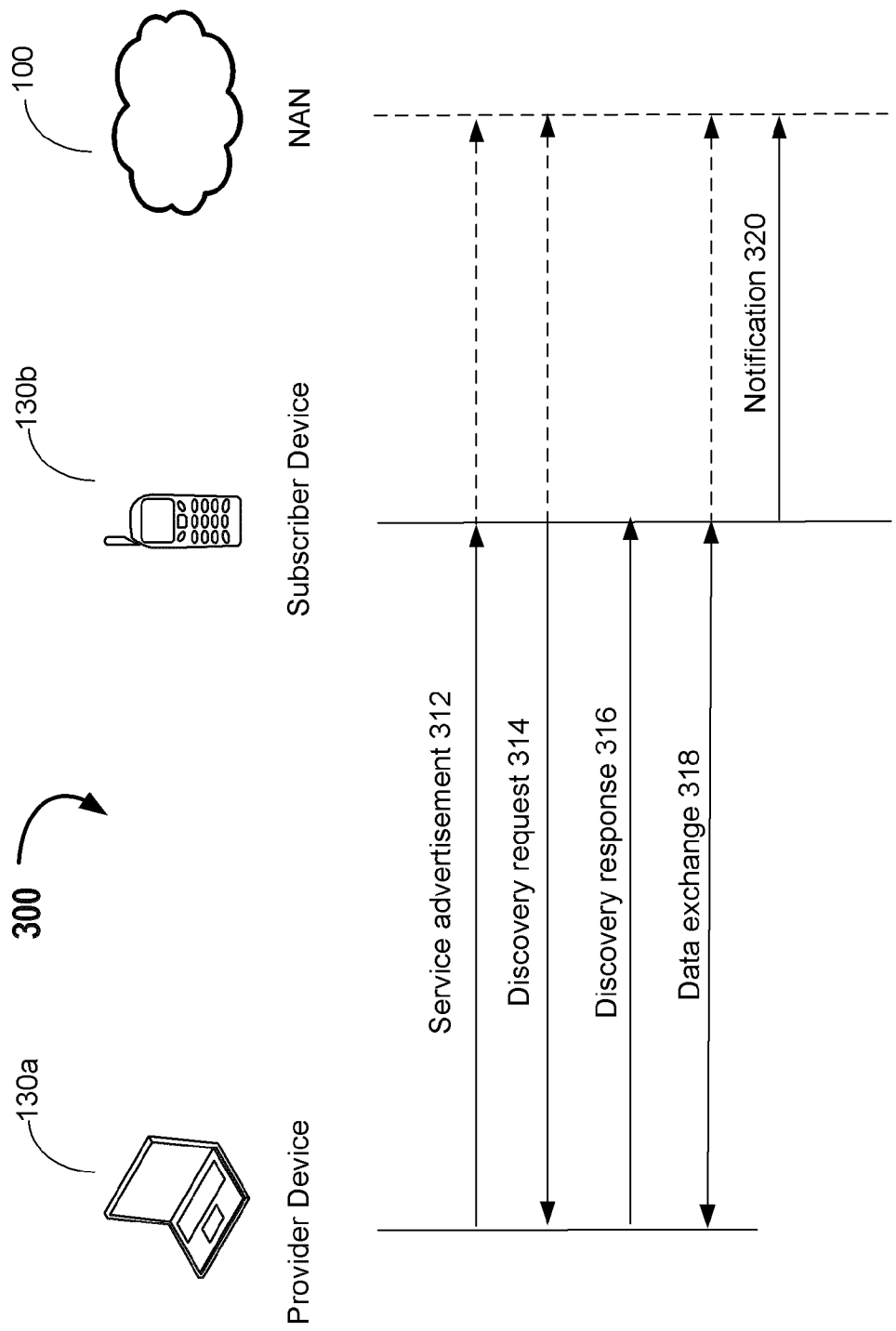
FIG. 3A illustrates a signal flow diagram between a service providing device and a subscriber device over the neighbor aware network of FIG. 1C according to the disclosure.

Referring to FIG. 3A, a signal flow diagram of the implementation of service discovery by a subscriber device over a NAN network is shown and generally designated signal flow 300. Signal flow 300 illustrates the service provider device 130a communicating with the subscriber device 130b. FIG. 3A depicts a single hop for simplicity depicting one provider device 130a and one subscriber device 130b, however as described above, multiple hops may fall between the provider device 130a and the subscriber device 130b or between the subscriber device 130b and additional subscriber devices (e.g., subscriber device 130c). In the illustrated aspect, the service provider device 130a may periodically transmit service advertisement message 312. The service advertisement message may also be referred to herein as a service announcement message 312. In some aspects, the service advertisement message 312 may be broadcast or multicast on the NAN network 100 (indicated as a dashed line) and include information regarding the identity and/or network address of the provider device 130a, the type and number of services provided, in addition to other parameters and characteristics discussed below.

In some embodiments, the service advertisement message 312 may include certain information identifying the mesh network or DP, the services provided, and information necessary to join or subscribe to the mesh network, DP, or service. These aspects are further described in connection with FIG. 3B-FIG. 3D. The subscriber device 130b may transmit a discovery request 314 either in response to the service advertisement 312 for a desired service, or as needed in the search for desired service(s). In some aspects, the discovery request 314 may be unicast to the service provider device 130a, based on reception of the service advertisement message 312. In some other implementations, the discovery request 314 may be broadcast or multicast on the NAN network 100 (shown in dashed lines). The discovery request message 314 may request identification of provider devices (e.g., provider device 130a) that may provide one or more services desired by the subscriber device 130b.

In response to receiving the service discovery request 314, the service provider device 130a transmits the service discovery response message 316. The service discovery response message 316 includes an indication of whether the service provider device 130a can provide one or more of the services indicated in the service discovery request 314.

In some aspects, one or more other characteristics of the mesh network 110 may be included in the service discovery response message 316. In some embodiments, a mesh initiator, such as the provider device 130a, may define certain parameters including a mesh network identifier (mesh network ID), a mesh network communication channel (mesh network channel), an indication of a mesh network size, and an indication of when paging windows occurred for the mesh network (paging window offset). In some embodiments, the discovery response 316 may further comprise such information as the service advertisement 312 identifying the mesh network or DP, the services provided, and information necessary to join or subscribe to the mesh network, DP, or service. In some aspects, the mesh network ID is based on or derived from a media access control (MAC) address of a mesh owner or initiator (e.g., provider device 130a). This information may include certain information such as the mesh network ID, mesh network channel, a mesh network key or mesh network group size, a paging window offset 166 (FIG. 1C). Certain of the various characteristics or parameters and data that may be included in the discovery response message 316 are further described below in connection with FIG. 3B-FIG. 3D. Following the discovery response 316, the provider device 130a and the subscriber device 130b may exchange data 318 according to the network 100 information and associated protocols.

In some aspects, the service advertisement messages 312 may be transmitted over the ad-hoc or NAN network 100 by the provider device 130a. These service advertisement messages 312 may be broadcast or multicast on the ad-hoc network 100 (indicated in the dashed lines). The service advertisement 312 may be transmitted asynchronously and may not be in response to a particular request or query from any other device on the NAN or ad-hoc network 100. Therefore, these service advertisement messages 312 may be received by devices currently receiving a similar service from a different service mesh network 110 having a different set of parameters.

In some aspects, upon receiving the service advertisement 312, a receiving device (e.g., the subscriber device 130b) may determine whether it is currently receiving a substantially similar service from a different mesh network 110 than that indicated by the received service advertisement 312. If so, the receiving device may compare the parameters of its current mesh network 110 to that of the service advertisement 312 to determine whether the mesh network indicated by the service advertisement 312 may be preferred over its current mesh network 110. If the receiving device 130 determines the mesh network indicated by the service advertisement 312 is preferred, the device 130 may switch service providers. For example, the device 130 may establish service with the mesh network 110a indicated by the service advertisement 312 and disconnect from the mesh network 110b it was previously using.

In some aspects, if a device 130 joining a mesh network 110 detects the presence of multiple mesh networks 110 that provide substantially similar services, the device 130 may broadcast, multicast, or otherwise notify other members of the network 100 that multiple service providers (e.g., the provider device 130a) exist. For example, a notification 320 may be transmitted by the subscriber device 130b to other devices 130. The notification 320 may perform a similar function as the service advertisement 312 described previously, except that it is initiated by a user device (e.g., the subscriber device 130b) of the mesh network 110 and not by the mesh initiator (e.g., the service provider 130a). The notification 320 may include one or more of the mesh network ID, mesh network channel, mesh paging window indication, mesh network size indicator, or one or more other characteristics of the mesh network 110, as discussed above in connection to the advertisement 312 and below in connection with FIG. 3B-FIG. 3D. Upon receiving such a notification 320, other members (e.g., the devices 130) of the ad-hoc network 100 may determine whether they are currently using a mesh network with less-preferred parameters than the newly announced mesh network. If so, one or more of the receiving devices 130 may switch from a current mesh network 110 to the newly announced mesh network 110. For example, the one or more receiving devices may repeat a mesh network peering process to join the mesh network indicated in the notification 320 and disconnect from the mesh network previously used to provide the service.

In some aspects, a mesh paging window offset indicates a paging window start time for the identified mesh network. The paging window start time may be indicated relative to a discovery window (DW) for a social Wi-Fi network. For example, the paging window start time may be represented as an offset from a discovery window (shown in FIG. 1D) for the social Wi-Fi network used to discover the mesh network and/or mesh initiator.

As discussed above, a paging window offset 166 (FIG. 1B) and a parameter indicating the number of paging windows (e.g., paging windows 161* of FIG. 1B) within each discovery window interval may indicate when paging windows occur for a particular mesh network. As discussed above, an interval of time between discovery windows may first be divided into a number of paging windows. The paging window offset 166 may then define when a particular mesh network's paging window 161\* occurs within each paging window. As discussed above, if a discovery window interval of 500 ms is divided into five paging windows, an offset of 5 ms indicating paging windows for a particular mesh network (e.g., mesh network 110*a*) at 5 ms, 105 ms, 205 ms, 305 ms, and 405 ms after the start of each discovery window.

As discussed above, in some aspects, the duration of a paging window may be determined based on a current number of mesh networks supported by social Wi-Fi network. In some other aspects, the number of paging windows for a particular mesh network within each discovery window interval of the social Wi-Fi network may vary based on the number of mesh networks currently supported by the social Wi-Fi network.

In some aspects, the paging window offset functions to ensure a service mesh has a paging window that does not overlap with a paging window of another service mesh. By providing for non-overlapping paging windows, devices listening on multiple service mesh networks may listen during distinct, non-overlapping time periods for messages relating to each mesh network. This may be particularly useful for devices utilizing receivers which may only listen on a single communication channel at a particular time.

A device participating in a mesh network may listen to, monitor for, or scan for information transmitted over the mesh network during an indicated paging window to determine whether another device on the mesh network is buffering data for it. In some aspects, whether data is buffered for a device may be communicated to the device during a respective paging window via the communication of a traffic indicator map. In some aspects, the traffic indicator map comprises an entry for each device that is part of the map. Upon receiving the traffic indicator map during the paging interval, a device on the map checks its respective entry in the map to determine whether any data is buffered for it.

In some aspects, the mesh network may be further identified by a parameter indicating an age of the mesh network. The age of the mesh network may be a number of microseconds that have elapsed since a device in the mesh network first invoked the NAN functionality. In this context, invoking NAN functionality may specifically be when a service provider device 130*a* first transmits a service advertisement message 312, as described above with reference to FIG. 3A. When a service provider device first transmits a service advertisement message, the service provider device may initialize a time factor to zero. Thereafter, the service provider device may increment the time factor by one for every microsecond elapsed.

The relative age of the mesh network may be utilized by a device in selecting which mesh network to join to obtain a particular service. For example, if multiple mesh networks offer a similar service, in some aspects, a device may prefer an older mesh network, as older mesh networks may be more well-established and/or larger in some aspects. An older mesh network may be the mesh network among a plurality of mesh networks which has the greatest time factor value. Since more than one mesh network may have the same time factor value, a hash value of an identifier may be used to determine uniqueness. In some aspects, a MAC address may be used as the identifier, and the hashed value of the MAC address may be added to the time value to form a time parameter. In this aspect, the mesh network with the largest time parameter would be considered the oldest mesh network.

In some aspects, the mesh network may be further identified by a parameter indicating whether the mesh network supports connectivity via Internet Protocol (IP) version 4 (IPv4). In some aspects, devices that do not support Internet Protocol (IP) version 6 (IPv6) may prefer mesh networks that support IP version 4. If all devices on a mesh network support IPv6, the IP addressing for the mesh network may be provided by a 4-way handshake during mesh network peering as described by the 802.11ai message protocol.

In some aspects, the subscriber device 130*b* may decide whether to seek the service from the provider device 130*a* based on one or more of the characteristics. For example, larger mesh networks may be preferred over smaller mesh networks, so that if two devices are providing the same service, the ad-hoc network tends to merge the smaller mesh networks into the larger mesh networks. In some other aspects, distribution of load across mesh networks and provider devices may be preferred. In these aspects, the subscriber device 130*b* may select a mesh network that has fewer devices receiving a service from the provider device of the mesh network.

In an embodiment, the mesh network ID may serve to identify a particular mesh network. The mesh network channel may serve to identify the channel (e.g., the WiFi Social channel 160) on which the mesh network is communicating. The mesh network channel may further be selected based upon a traffic density on the channel, wherein, for example, the channel is selected based on the least crowded channel.

Figure 3B:
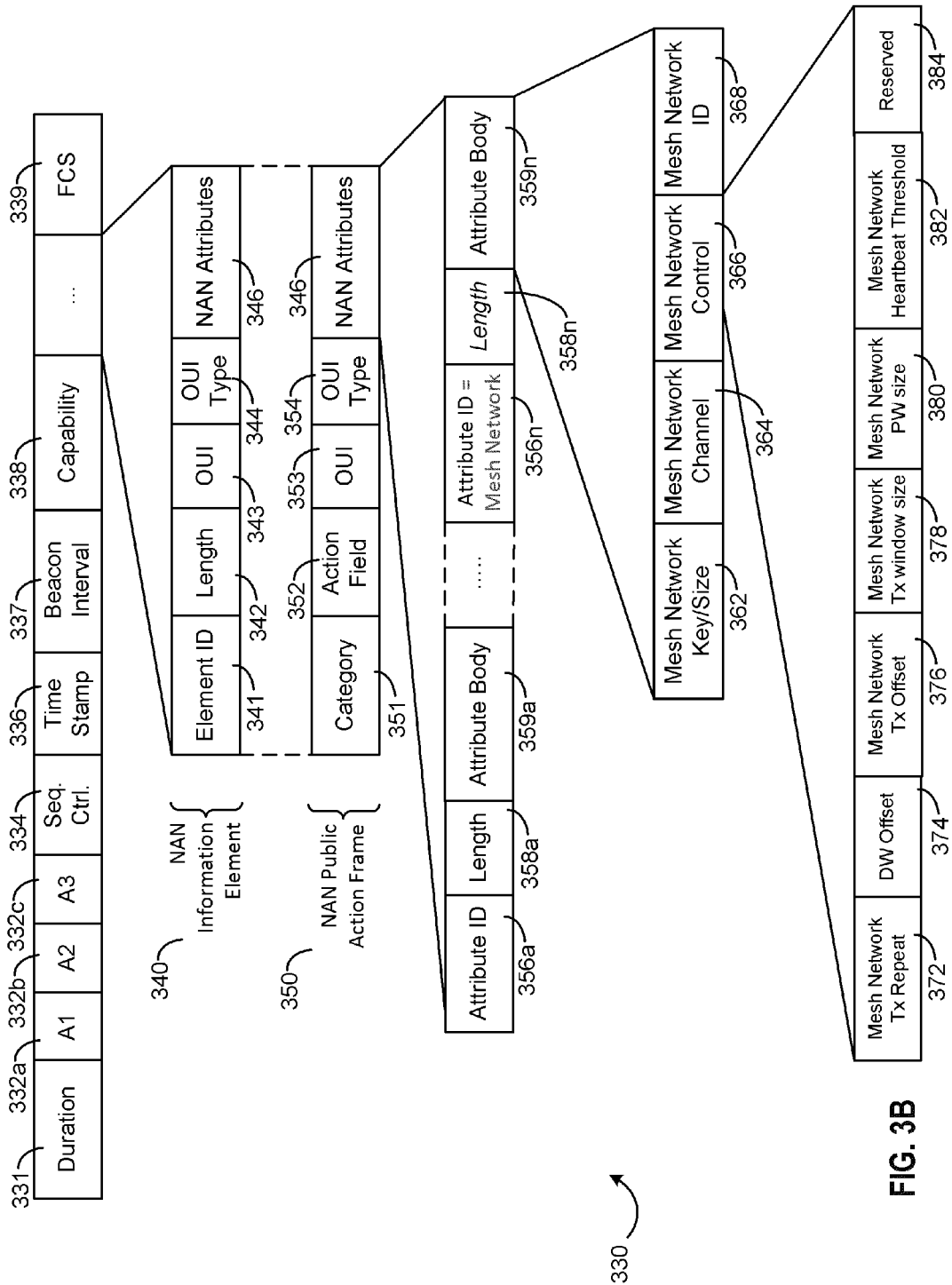
FIG. 3B illustrates a neighbor aware network frame format according to the disclosure.

FIG. 3B depicts a NAN frame format 330 of a service advertisement 312 according to an embodiment. In some embodiments, the discovery response 316 may also include some or all of the information included in frame format 330 or the service advertisement 312.

The NAN frame format 330 may comprise certain standard frames such as a duration field 331, addressing blocks 332*a*-332*c*, a sequence control field 334, a time stamp field 336, a beacon interval field 337, a capability field 338, and a frame check sequence ("FCS") field 339.

In an embodiment, the NAN frame format 330 may further comprise a vendor-specific NAN Information Element (IE) 340 or a vendor-specific NAN Public Action Frame 350.

The NAN IE 340 may comprise an Element Identification (ID) field 341 identifying the specific NAN IE to the receiver (e.g., the subscriber device 130*b*). The NAN IE 340 may comprise a length field 342, indicating the length of the NAN IE 340. The NAN IE 340 may comprise an Organizationally Unique Identifier (OUI) field 343 and OUI type field 344 specific to the NAN, the mesh network, the mesh network group, or the protocol over which the data is transmitted. The NAN IE 340 may further comprise various NAN attributes 346. Similarly, the NAN public action frame format 350 may comprise blocks for a category field 351, action field 352, OUI field 353, OUI type field 354, and various NAN attributes 346.

Common to both the NAN IE 340 and the NAN public action frame 350 formats are the NAN attributes 346, also referred to herein as service descriptor attributes 346. The NAN attributes may be further broken down into blocks for an attribute ID field 347*a*, a length field 348, and a service descriptor attribute body field 349. As shown, multiple NAN attributes may be included in the NAN attributes field 346. In certain embodiments of the NAN frame format 330, the NAN attribute field 346 may be further subdivided into separate subfields. The NAN attributes field 346 may comprise an attribute ID field 356a identifying the type of NAN attribute indicated in the NAN attributes field 346 while also identifying the specific NAN mesh network to which attribute is associated. The NAN attributes field 346 may further comprise a length field 358a indicating the length (e.g. in bits) of the NAN attributes subframe identified by the NAN attribute ID 356a. The NAN attributes field 346 may further comprise an attribute body field 359a indicating the actual data payload containing the NAN attribute information. In some embodiments, multiple NAN attributes may be combined or appended to one another, providing a means for transmitting multiple attributes at once. As shown, the attributes 356a through attribute 356n may be included in the same transmission.

As shown, the attribute body field 359 (e.g., the attribute bodies 359a-359n) may further include multiple subfields. Referring briefly to FIG. 3C, a table 360 is shown listing the various subfields that may be included in the attribute body field 349 of FIG. 3B.

The attribute body field 359 may comprise a mesh network key/size field 362. The mesh network key/size field 362 will generally be referred to herein as a mesh network key field 362 for simplicity. The mesh network key field 362 may be useful to distinguish between two mesh network networks having the same mesh network ID (see below). The mesh network key field 362 may be selected randomly by the mesh network originator or another randomization process (e.g., a hash function). The mesh network key field 362 may also include an indication of the size of the mesh network.

The indication of mesh network size by the mesh network key field 362 may, in some aspects, be equivalent to a current number of devices utilizing the mesh network to receive a service. The indication of the mesh network size may be determined by a provider device in the mesh network. In some aspects, the provider device 130a is the "root" device in a proactive routing method used by the mesh network 110. The provider device 130a is then able to obtain an estimate of the number of devices participating in the mesh network 110 based on an identity as the "root" device.

In some aspects, the mesh network size indication may assist devices joining the mesh network 110 in selecting between multiple mesh networks 110 that provide the same or a similar service. For example, to facilitate the merging of multiple small mesh networks 110 (e.g., the mesh network 110a) into larger mesh networks 110 (e.g., the mesh network 110b), a device selecting a mesh network 110 may prefer larger mesh networks 110 over smaller mesh networks 110.

The attribute body field 349 may further comprise a mesh network channel field 364. The mesh network channel field 364 may contain information identifying a communication channel upon which the mesh network 110 operates. In some aspects, the mesh network channel may be selected at a time the mesh network 110 is created. The mesh network channel may be selected, at least in part, from a plurality of channels and identified by the mesh network channel field 364. For example, a channel that is least utilized may be selected for use by the mesh network at the time of mesh network creation.

The attribute body field 349 may further comprise a mesh network control field 366. The mesh network control field 366 may include certain mesh network transmission conditions, described below in connection with FIG. 3D.

The attribute body field 349 may further comprise a mesh network ID field 368, indicating the mesh network group to which the message is transmitted, and used by the provider device 130a to identify the mesh network 110 according to the service provided. In an embodiment, the service discovery response 316 may comprise the identity of one or more of a number of other mobile devices 130 receiving the service from the provider device 130a, an indication of an age of the mesh network, an indication of available capacity of the mesh network, an indication of whether Internet Protocol version 4 (IPv4) may be used to receive the service from the mesh network, or an indication of expected performance when using the mesh network. The mesh network ID 368 may be unique across the particular mesh network 110 and/or NAN networks.

Referring back to FIG. 3B, the mesh network control field 356 may further comprise a plurality of subfields. Referring briefly to FIG. 3D, a table 390 is shown listing various subfields that may be included in the mesh network control field 366 of FIG. 3B. The mesh network control field 366 may comprise a transmit repeat field 372 that may indicate whether the mesh network transmit window repeats a plurality of times between consecutive discovery windows (DW). The mesh network control field 366 may further comprise a DW offset field 374 that indicates when a mesh transmit window starts, following the DW (FIG. 1B). For purposes of the mesh network control field 366, 1024 seconds (sec) may be considered one time unit (TU). Accordingly, the values of the various fields comprising the mesh network control field 366 may refer to time as a number of "TU's." The value of the DW offset field 374 may be set to: 0: 0 TU; 1: 16 TU; 2: 32 TU; and 3: 64 TU. The mesh network control field 366 may further comprise a mesh network transmit offset field 376 indicating the transmit window start time offset between consecutive mesh network transmit windows. The values of the mesh network transmit offset field 376 may be set as: 0: 0 TU; 1: 16 TU; 2: 32 TU; 3: 64 TU. The mesh network control field 366 may further comprise a mesh network transmit window size field 378 indicating the size of the mesh network transmit window. The value may be set as: 0: 64 TU; 1: 128 TU; 2: 256 TU; 3: reserved. The mesh network control field 366 may further comprise a mesh network PW size field 380 indicating the size of the PW occurring at the beginning of each mesh network transmit window. The values of the mesh network PW size field 380 field may be set as: 0: 2 TU; 1: 5 TU; 2: 8 TU; 3: 12 TU. The mesh network control field 356 may further comprise a mesh network heartbeat threshold field 382, indicating the time for which the mesh network will remain alive without receiving any provider heartbeat to maintain the mesh network. The mesh network heartbeat threshold field 382 may be set, for example to: 0: 30 sec; 1: 60 sec; 2: 120 sec; 3: 300 sec. The mesh network control field 366 may further comprise a reserved field 384 for future expansion.

Figure 4:
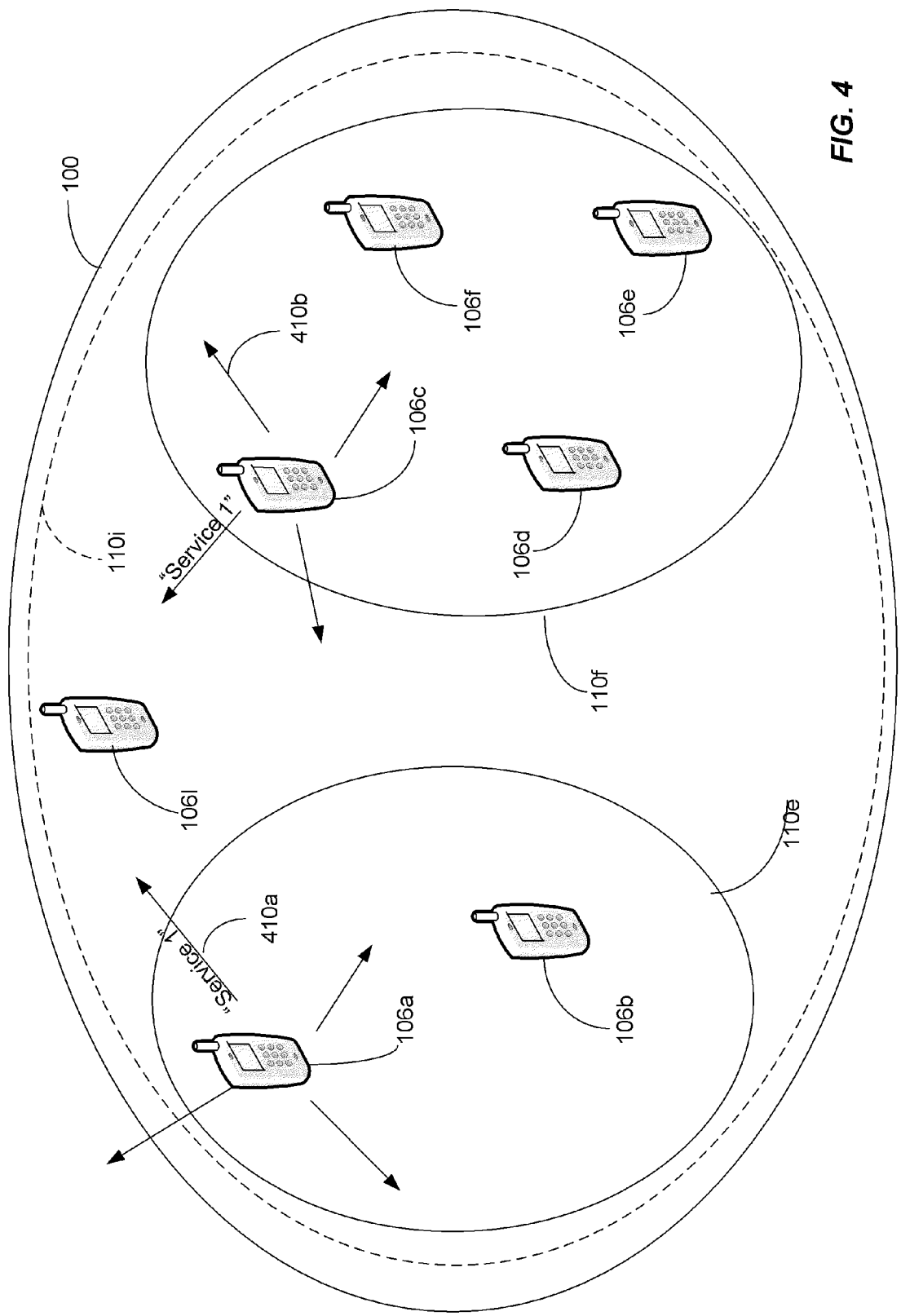
FIG. 4 illustrates a message exchange over the neighbor aware network of FIG. 1A according to the disclosure.

FIG. 4 shows an exemplary embodiment of a communication system 400. The communication system 400 may be similar to the communication system 100 (FIG. 1A). FIG. 4 shows two mesh networks 110e and 110f, each providing a substantially similar service named "service 1." mesh network 110e includes a mesh network initiator or provider device 106a. mesh network 110e also includes device 106b. mesh network 110f includes a mesh network initiator or provider device 106c. mesh network 110f further includes devices 106d-f. Each mesh network 110e, 110f may include a plurality of multi-hop data paths among the devices 106. In the illustrated embodiment of FIG. 4, both of mesh network initiator or provider devices 106a and 106c periodically transmit service announcement messages 410a and 410b respectively. Each of service announcement messages 410a-b includes a description of the service being provided and at least an indication of the size of mesh networks 110e-f respectively. For example, service announcement message 410a may indicate the mesh network 110e includes two (2) devices, while service announcement message 410b may indicate the mesh network 110f includes four (4) devices.

Device 106l is shown in the process of determining which of mesh networks 110e-f to join in order to receive "Service 1." Device 106l is positioned so as to receive both of service announcement messages 410a-b. In some aspects, the device 106l may determine which of mesh networks 110e-f to join based on an indication of the size of each of mesh networks 110e-f in each of the service announcement messages 410a-b respectively. In aspects that prefer larger mesh networks, device 106l may join mesh network 110f In aspects that prefer smaller mesh networks, for example, those operating under the assumption that smaller mesh networks provide for improved performance, device 106l may join mesh network 110e.

In some aspects, device 106b may also receive service announcement messages 410a-b. Upon receiving service announcement message 410b from mesh network initiator 106c, the device 106b may determine that mesh network initiator or provider device 106c provides a substantially similar service as mesh network initiator or provider device 106a. In aspects that prefer larger mesh networks to smaller mesh networks, device 106b may determine that mesh network 110f is larger than mesh network 110e, and therefore utilization of mesh network 110f is preferred over use of mesh network 110e. As a result, device 106b may disconnect from mesh network 110e and join mesh network 110f in these aspects. As the device 106a and the device 106b also discover Service 1 as advertised by device 106c, they too may join the larger mesh network 110f Accordingly, the mesh network 110e merges into the mesh network 110f, resulting in a single mesh network 110i (shown in dotted lines), providing Service 1. In other aspects that prefer smaller mesh networks, device 106b may remain a member of mesh network 110e and forgo switching to mesh network 110f.

Figure 5:
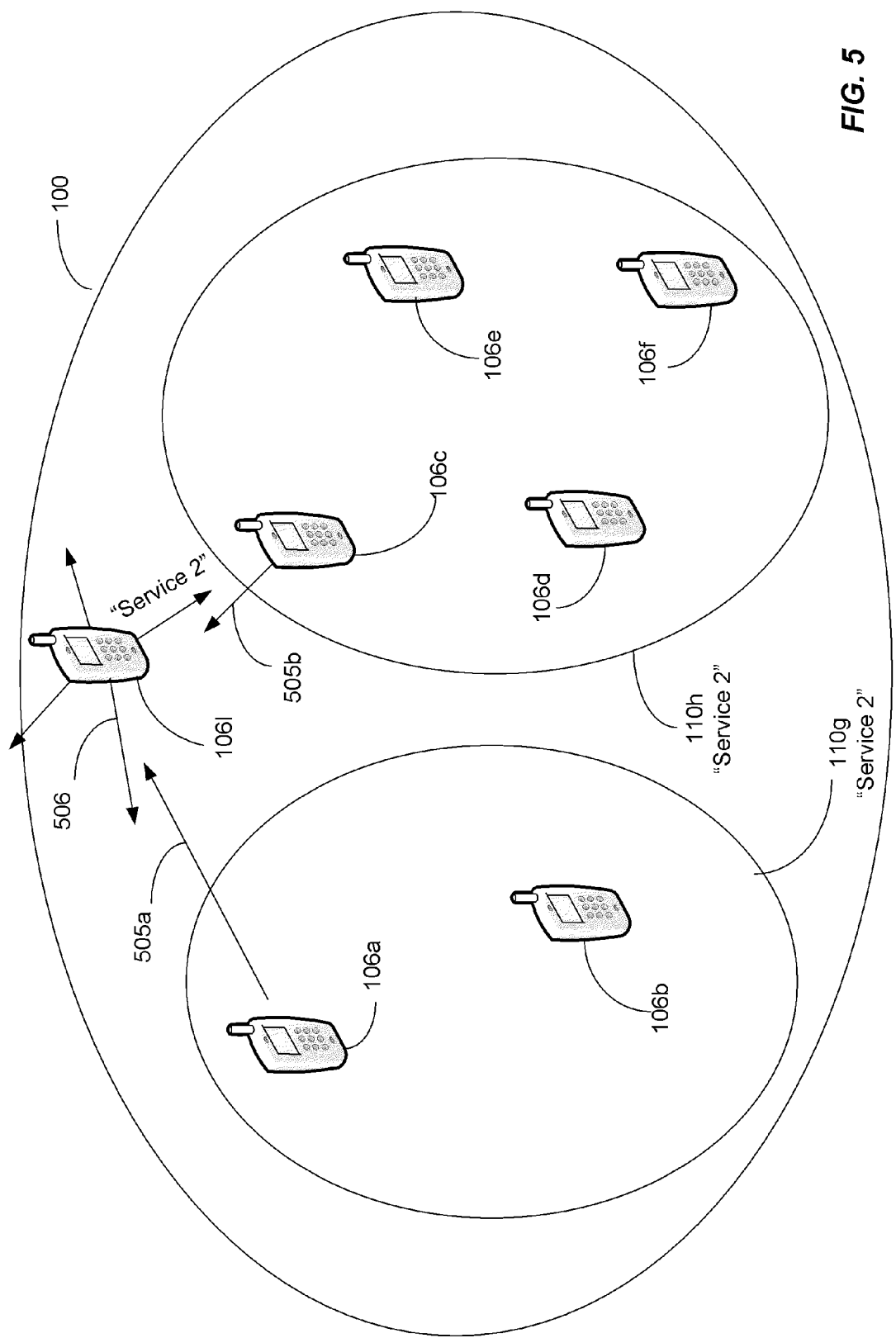
FIG. 5 illustrates a message exchange over the neighbor aware network of FIG. 1A according to the disclosure.

FIG. 5 shows an exemplary embodiment of a communication system 500. The communication system 500 may operate similarly to the communications system 100 (FIG. 1) or the communications system 400 (FIG. 4). FIG. 5 shows two mesh networks 110g and 110h, each providing a substantially similar service "service 2." mesh network 110g includes a mesh network initiator or provider device 106a. mesh network 110g also includes device 106b. mesh network 110h includes a mesh network initiator or provider device 106c. mesh network 110h further includes devices 106d-f. Each mesh network 110e, 110f may include a plurality of multi-hop data paths among the devices 106.

In the embodiment of FIG. 4, the mesh network initiator or provider devices 106a and 106c may periodically transmit service announcement messages as noted above. In the embodiment of communication system 500 of FIG. 5 however, the device 106l, which is seeking "service 2," broadcasts or multicasts a service discovery message 506. The service discovery message 506 is received by both mesh network initiator or provider devices 106a and 106c. Since both mesh network initiator or provider devices 106a and 106c provide service 2, both devices respond to the discovery request 506 with discovery response messages 508a-b respectively. The discovery response messages 508a-b may include one or more of the mesh network ID parameters discussed above, including one or more of a identifier, mesh network channel, an indicator of a mesh network paging window, such as a paging offset from a discovery window, mesh network size indication, mesh network age indication, and or an indication of whether the mesh network supports IPv4. Device 106l receives each of discovery response messages 505a-b, and then determines whether to join the mesh network 110g or the mesh network 110h for service 2. In one aspect, the determination may be based on the mesh network size indication included in the discovery responses 505a-b.

Upon identifying that two mesh network initiator or provider devices provide substantially the same service ("Service 2"), device 106l may optionally transmit an announcement message (not shown) via the communications network 500 indicating such a detail to other devices within range, for example the devices 106 of mesh network 110g and mesh network 110h. For example, the announcement message may indicate that both mesh networks 110g-h provide "Service 2," and may also include an indication of the size of each mesh network. Alternatively, device 106l may transmit the announcement message indicating only a preferred mesh network for service 2. For example, if large mesh networks are preferred over smaller mesh networks, the announcement message may indicate only mesh network 110h, along with one or more parameters identifying the mesh network (as discussed previously).

In another embodiment where small mesh networks are preferred, the announcement may indicate mesh network 110g, along with one or more parameters identifying mesh network 110g. Accordingly, both of the mesh networks 110g, 110h will remain.

Upon receiving the announcement message from device 106l, one or more of devices 106a, 106b, or 106d-f may decide to switch from their current mesh network to the announced mesh network. Each of the devices 106a-b or the devices 106d-f may determine whether to switch may be based on one or more mesh network parameters included in the announcement along with parameters of their existing mesh network.

In an embodiment, the device 106l selects the larger mesh network 110h after transmitting the announcement message indicating that the mesh network 110h is the preferred mesh network. The device 106a and the device 106b may receive the announcement message and proceed in a similar manner, selecting the larger mesh network 110h. Accordingly, the smaller mesh network 110g merges into the larger mesh network 110h.

Figure 6:
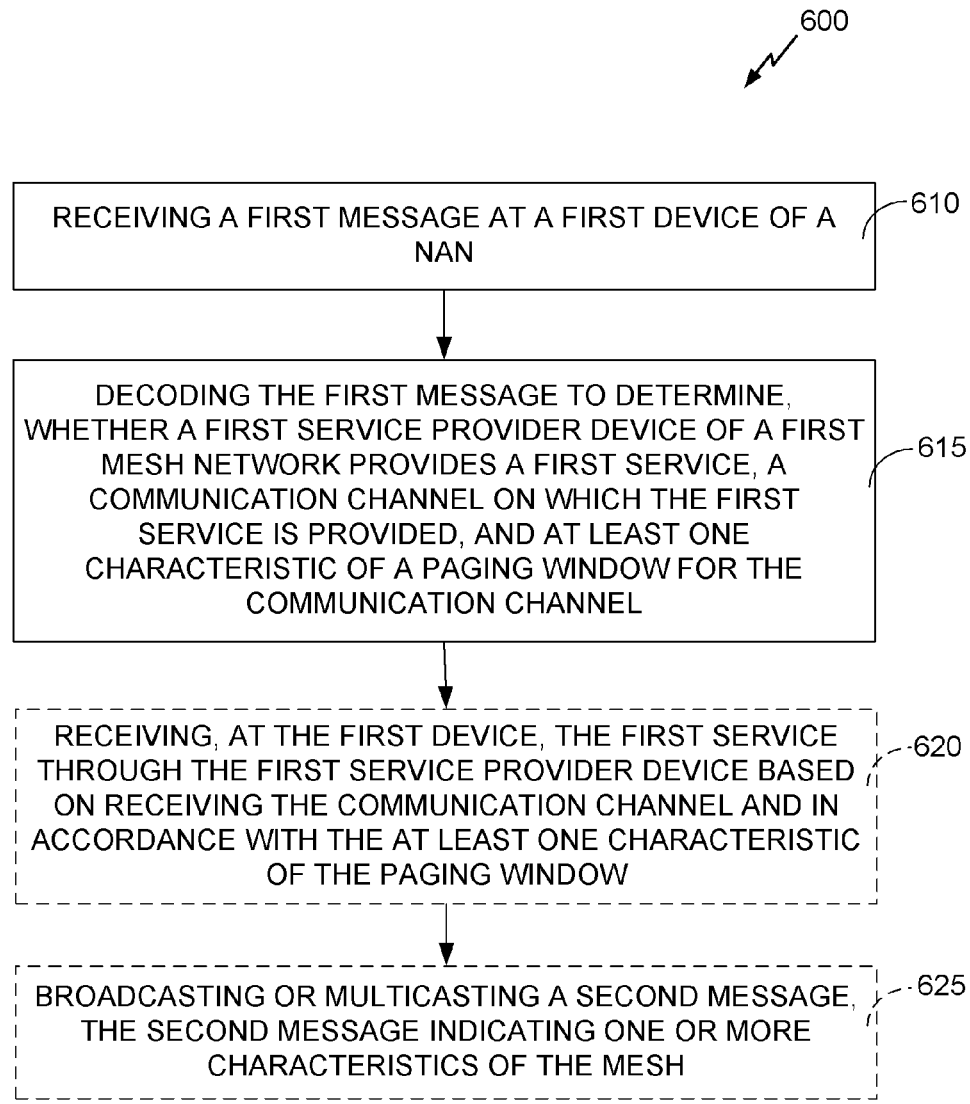
FIG. 6 is a flowchart of a method of establishing communication with a service mesh on the neighbor aware network of FIG. 1C according to the disclosure.

FIG. 6 is a flowchart of a method 600 of establishing communication with a service mesh network. The method 600 may be performed, in some aspects, by any of wireless devices 130a-1 and/or the wireless device 202. In some aspects, the method 600 may be performed by the device 106l shown in FIG. 4 or FIG. 5. In some aspects, the method 600 may enable a device to interoperate with another device performing the method 700, discussed below with respect to FIG. 7.

To ensure adequate network capacity, the method 600 may utilize separate communication channels for service discovery and service delivery. While timing synchronization may be performed on the service discovery channel, it may not be performed separately for the service delivery channel. Instead, communication on the service delivery channel is synchronized based on synchronization information determined from the service discovery channel. By utilizing separate communications channels, communications overhead associated with beaconing on the first communications channel may be leveraged by the second communications channel, reducing an amount of network capacity utilized to maintain the service delivery networks/channels.

In block 610 a first message is received at a first device of the NAN network. In some aspects, the first message received in block 610 may be substantially similar to the discovery response message 316 described with respect to FIG. 3. In some other aspects, the received message may be substantially similar to the service advertisement message 312 described with respect to FIG. 3. In some aspects, the first message is received over a first communication channel, such as communication channel 160 of FIG. 1B.

In block 615, the first message is decoded to determine whether a first service provider device of a first mesh network (e.g., the provider device 130a of FIG. 1C) provides a first service. In some aspects, the first message received in block 610 is received from the provider device. In some aspects, the provider device may be identified by one or more of an IP address, at least a portion of a MAC address, and/or a hostname of the service provider device. In some aspects, the identification of the provider device may also identify a mesh network used to provide the service. In some aspects, a mesh network identifier may be decoded from the response. The mesh network identifier may be comprised of portions of an identifier of the provider device 130 along with a service identifier.

In block 615, the first message is also decoded to determine a communication channel on which the first service is provided. In some aspects, the determined communication channel is a second channel, different than the first communication channel discussed above with respect to block 610.

In block 615, the first message is also decoded to determine at least one characteristic of a paging window (e.g., the paging window 161, 162, 163 of FIG. 1B) for the (second) communication channel. In some aspects, a characteristic of the paging window may be a page window offset (e.g. the page window offset 166 of FIG. 1B) in the message. To determine the paging window, the page window offset may be added or subtracted from either a start or end time of a discovery window of the first communication channel. With this approach, synchronization that occurs on the first communication channel may be utilized to provide synchronization on the second communication channel.

In some aspects, a characteristic of the paging window for a particular communication channel may be both a page window offset and a number of paging windows during a time interval between discovery windows (e.g., discovery window interval 152). For example, if an interval of time between discovery windows is 400 ms, this interval may be divided into eight separate paging windows. A page window offset of 10 ms would indicate paging windows at 10 ms after the start of a discovery window 60 ms after the start of the discovery window, 110 ms, 160 ms, 210 ms, 260 ms, 310 ms, and 360 ms after the start of the discovery window. Note that the number of paging windows between discovery intervals and/or the paging offset may be selected such that a paging window for a particular communication channel does not overlap with the discovery window. This may enable participating devices to both listen to the discovery window of the first communication channel and the paging window(s) for the second communication channel.

A mobile device 130 performing the method 600 may listen on the NAN network for indications that data is buffered for it during the paging window(s). In some aspects, the device performing the method 600 may enter a sleep or doze state during periods of time outside the paging windows of the second channel and the discovery window of the first channel. In some aspects, the first message received in block 610 is received through a first multi-hop data path within the first mesh network. Within the multi-hop data path, there may be a device receiving the first service.

Some aspects of the method 600 further include decoding the message received in block 610 to determine one or more characteristics of the mesh network (e.g. the mesh networks 110) used by the service provider device (e.g., the provider device 130a of FIG. 1C) to deliver the service. In some aspects, the one or more characteristics may include a number of devices receiving the service from the provider device, an indication of an age of the mesh network, an indication of available capacity of the mesh network, an indication of whether IPv4 may be used to receive the service from the mesh network, or an indication of expected performance when using the mesh network.

In block 620, subscriber first device (e.g., the subscriber device 130e) may receive the first service through the first service provider device (e.g. the provider device 130d). The delivery may be based on receiving the communication channel and in accordance with the at least one characteristic of the paging window. The block 620 is shown in dashed lines indicating that the step is not necessary to the proper functioning of the method 600. In some aspects, the step 620 may be considered optional.

Some aspects of the method 600 may further include transmitting a request for the service on a neighbor aware network. In some aspects, the transmitted request may be substantially similar to the discovery request message 314 described with respect to FIG. 3. In some aspects, the request for a service may be transmitted on the first communication channel 160. In some aspects, the request for the service may be broadcast or multicast on the NAN. The first message received in block 610 may be a service discovery response message.

Some aspects of the method 600 further include receiving a plurality of messages indicating that the service may be provided by a plurality of corresponding provider devices. In some aspects, this plurality of messages may all be service discovery response messages. In some aspects, a device performing the method 600 may select between multiple service provider devices indicated by the plurality of messages. For example, if two or more of the plurality of messages indicate that different devices can provide substantially similar services, the device performing the method 600 may need to select a single device from which the service will be obtained.

In some aspects, this selection is based on one or more characteristics of the mesh networks (e.g., the mesh networks 110 of FIG. 1C, FIG. 4, FIG. 5) used to provide the service by the provider devices. For example, a first provider device may utilize a mesh network (e.g. the mesh networks 110a-110i) that includes a first number of wireless devices, while a second provider device may utilize a mesh network (e.g. the mesh networks 110a-110i) that includes a second number of wireless devices, with the second number of devices being larger than the first number of devices. In aspects that prefer larger mesh networks over smaller mesh networks, the device performing the method 600 may select the second provider device for service delivery, since it utilizes a larger mesh network. In aspects that prefer smaller mesh networks over larger mesh networks, for example, for performance reasons, the device performing the method 600 may select the first provider device over the second provider device. In this way, a subscriber device may select a mesh network for delivery of a particular service by evaluating one or more characteristics of each mesh network relative to at least one criterion.

Some aspects of the method 600 may further include broadcasting or multicasting a second message identifying one or more mesh networks discovered during the method 600. As shown in block 625 (shown in dashed lines), the second message may indicate one or more characteristics of the mesh network. The block 625 is shown in dashed lines indicating that it is not critical for the proper functioning of the method 600. In some aspects the block 625 may be omitted.

For example, in some aspects, a device performing the method 600 may determine that two mesh networks provide substantially similar services, but one of the two mesh networks provides significant benefits compared to a second of the two mesh networks. In response to this determination in some aspects, the device performing the method 600 may transmit a message identifying the first mesh network, and one or more characteristics of the first mesh network as shown in block 625. Other devices within the NAN may receive the second message and as a result, switch their service to the mesh network identified in the second message. In other aspects, a message "announcing" a mesh network and its characteristics may be broadcast or multicast whenever a device joins a particular mesh network. Devices receiving these "announcements" may similarly switch their service to the announced mesh network if appropriate. With either example approach, consolidation of duplicative service mesh networks may be achieved.

Figure 7:
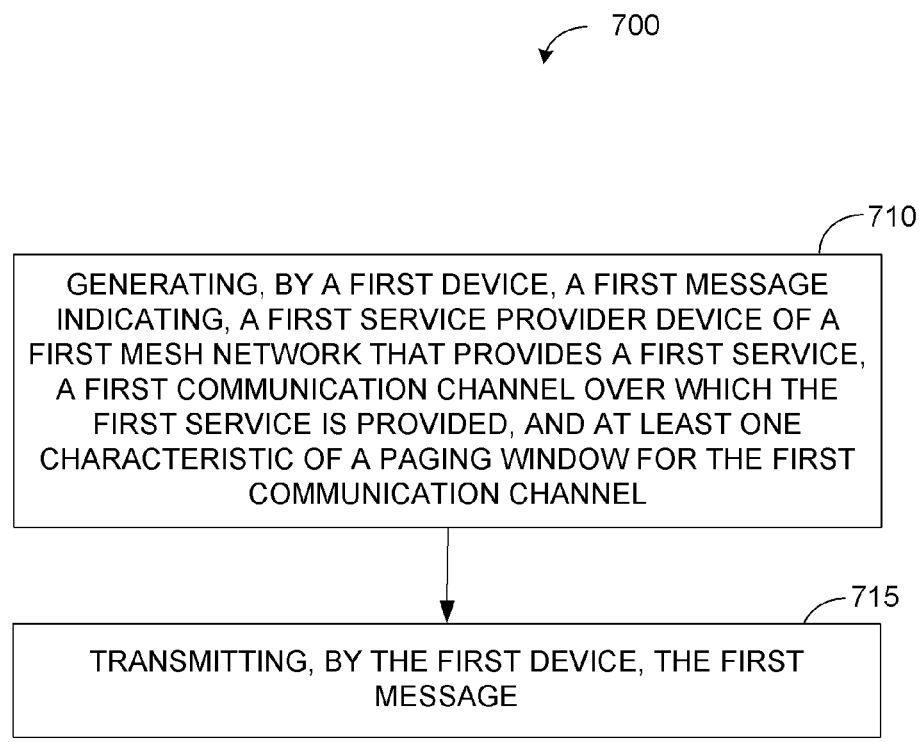
FIG. 7 is a flowchart of a method for providing a service over a service mesh on the neighbor aware network of FIG. 1C according to the disclosure.

FIG. 7 is a flowchart of a method 700 for providing a service over a service mesh network. In one aspect, the method 700 may be performed by the wireless device 202. In some aspects, a device performing the method 700 may operate on a social Wi-Fi network, for example, an 802.11s network. The first channel of the social Wi-Fi network may be used primarily for synchronization and service discovery, while additional channels may be used for the delivery of service data. In some aspects, channel six (6) of the social Wi-Fi network is used for service discovery. In some aspects, the method 700 may be performed by the device 106a or 106c of FIG. 5. In some aspects, the method 700 may be performed by the device 106a or 106c as described with reference to FIG. 4. In some aspects, the method 700 may enable a device to interoperate with another device performing the method 600, discussed above with respect to FIG. 6.

In block 710, a message is generated. In some aspects, the message generated in block 710 may be substantially similar in some aspects to the discovery response 314 discussed above with respect to FIG. 3. The message is generated to indicate a first service provider device of a first mesh network that provides a first service. The first service provider device may also be known as a "provider device." In some aspects, the device that can provide the service is the same device that is generating the message. The message may identify the provider device via inclusion of one or more of an IP address, hostname, or media access control address of the provider device in the generated response.

The provider device may provide service data via a mesh network in some aspects. For example, service data may be provided over a mesh network that utilizes the hybrid wireless mesh network protocol (HWMP) in some aspects. The mesh network may be comprised of a mesh network initiator, which may be the provider device, and other devices receiving service data from the provider device. The message may be generated to indicate a mesh network identifier for the mesh network used to provide the service data. In some aspects, the mesh network identifier may identify the provider device, and as such include one or more of an IP address, hostname, or media access control address of the provider device. In block 710, the message is also generated to indicate a first communication channel (e.g., communication channel 160) over which data associated with the first service is provided.

In block 710, the message is further generated to indicate at least one characteristic of a paging window (e.g., paging windows 161, 162, 163) for the first communication channel. The at least one characteristic of the paging window for the first communication channel may be a paging offset relative to a discovery window on a second communication channel. As discussed above, in some aspects, the at least one characteristic may be a timing of paging windows for the first communication channel indicated by a parameter defining the number of paging windows that occur between discovery windows on a second communication channel. This second communication channel may correspond to the "first social Wi-Fi network" discussed above, which may be utilized primarily for service discovery and synchronization, at least in the context of this disclosure. The paging windows for the first communication channel may be determined by dividing a time interval between discovery windows on the second communication channel by the parameter, and adding the paging offset to the beginning of each divided interval of time, examples of which are provided above.

In some aspects, one or more of the parameters defining the number of paging windows that occur between discovery windows (i.e. the "paging window interval"), and/or a paging window duration may be determined based on a current number of mesh networks supported with a single social Wi-Fi network used for synchronization (the second communication channel referenced above). For example, some implementations may utilize a fixed paging window duration, but may vary the number of paging windows for a particular mesh network per "paging window interval" based on a number of current mesh networks supported. Some other implementations may utilize a fixed number of paging windows (for a particular mesh network) per discovery window interval, but may vary the duration of each paging window to provide additional "room" within the discovery window interval for more mesh networks as the number of current mesh networks increases. Some implementations may vary both the duration of a paging window and the number of paging windows (per mesh network) per discovery window interval based on the current number of supported mesh networks.

In some aspects, the method 700 further includes generating the message to indicate one or more characteristics of the mesh network, including one or more of a mash identifier, an indication of the size of the mesh network, the age of the mesh network, and/or an indication of whether the mesh network supports IPv6.

In block 715, the generated message is transmitted on the NAN. In some aspects, the message is transmitted to a device requesting the service. In some aspects, the message is transmitted over the second communication channel.

The method 700 may further include receiving a request for the service from a NAN. In these aspects, the message generated in block 710 may be generated in response to reception of the request. In some aspects, the request was transmitted by a subscriber device. The request may be substantially similar to the discovery request 314 discussed above with respect to FIG. 3. In some aspects, the request is received over the second communication channel.

When a device performing the method 700 is a provider device, some aspects of the method 700 further include providing service data over the first communication channel based on the paging window offset. In some aspects, providing service data based on the paging window offset may include listening on the first communications channel during the paging window indicated by the paging window offset. Indications that data is buffered for the device may be received during the paging window. Alternatively, providing service data based on the paging window offset may include transmitting an indication of whether data is buffered for a second device on the first communication channel during the paging window.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of communication in a neighbor aware network (NAN) comprising at least a first mesh network, each mesh network having at least a first multi-hop data path, comprising:

receiving a first message at a first device of the NAN through the first multi-hop data path within the first mesh network; and
decoding the first message to determine:
   whether a first service provider device of the first mesh network provides a first service;
   a communication channel on which the first service is provided; and
   at least one characteristic of a paging window for the communication channel;
establishing delivery of the service from the provider device based on the communication channel and the at least one characteristic of the paging window;
decoding the first message to determine a first characteristic of the first mesh network;
decoding a second received message to determine whether a second service provider device of a second mesh network is capable of providing the first service and to determine a second characteristic of the second mesh network; and
selecting either the first service provider device or the second service provider device for delivery of the first service based on the first characteristic and the second characteristic,
wherein the first or the second characteristic includes an indication of an age of respectively the first or second mesh network, the indication of the age based on the time elapsed since a root device of each respective mesh network initially provided the first service.

2. The method of claim 1, further comprising:
receiving, at the first device, the first service through the first service provider device based on receiving the communication channel and in accordance with the at least one characteristic of the paging window; and
broadcasting or multicasting a second message, the second message indicating one or more characteristics of the first mesh network.

3. The method of claim 1, wherein the decoding of the first message further comprises determining a first characteristic of the first mesh network, the first characteristic comprising one or more of:
a size of the first mesh network, wherein the size comprises a number of devices receiving the first service from the first service provider device;
an age of the first mesh network, wherein the age of the first mesh network comprises the time elapsed since the first service provider device initially provided the first service;
an available capacity of the first mesh network;
whether the first mesh network supports connectivity through Internet Protocol version 6; and
an expected performance when using the first mesh network.

4. The method of claim 1, wherein the first message comprises a service advertisement message including an indication of at least one other service provided by the first service provider device.

5. The method of claim 1, further comprising:
determining, based on the at least one characteristic of the paging window:
   a paging offset,
   a discovery window for the first communications channel,
   a location of the paging window, and
   a duration of the paging window; and
scanning for a second message on a second communications channel during the duration of the paging window.

6. The method of claim 1, wherein the first message comprises a service discovery response message sent in response to receiving a service discovery request message for the first service.

7. The method of claim 1, wherein the first characteristic includes a size of the first mesh network and the second characteristic includes a size of the second mesh network, and wherein the size of the first and second mesh networks includes a number of devices utilizing each respective mesh network to receive the first service.

8. An apparatus for utilizing a service provider on a neighbor aware network (NAN) comprising at least a first mesh network having at least a first multi-hop data path, comprising:
   a receiver of the NAN configured to receive a first message through a device utilizing the first multi-hop data path within the first mesh network; and
   a processor configured to decode the first message to determine:
      whether a first service provider device of the first mesh network provides a first service,
      a communication channel on which the first service is provided, and
      at least one characteristic of a paging window for the communication channel, and
   wherein the processor is further configured to:
      establish delivery of the service from the provider device based on the communication channel and the at least one characteristic of the paging window,
      decode the first message to determine a first characteristic of the first mesh network,
      decode a second received message to determine whether a second service provider device of a second mesh network is capable of providing the first service and a second characteristic of the second mesh network, and
      select either the first service provider device or the second service provider device for delivery of the service based on the first characteristic and the second characteristic, wherein the first or second characteristic includes an indication of an age of respectively the first or second mesh network, the indication of the age based on the time elapsed since a root device of each respective mesh network initially provided the first service.

9. The apparatus of claim 8, wherein the processor is further configured to:
   establish delivery of the first service from the first service provider device based on receiving the communication channel and in accordance with the at least one characteristic of the paging window; and
   broadcast or multicast a second message, the second message indicating one or more characteristics of the first mesh network.

10. The apparatus of claim 8, wherein the processor system is further configured to decode the first message to determine a first characteristic of the first mesh network, wherein the first characteristic comprises one or more of:
   a size of the first mesh network, wherein the size comprises a number of devices receiving the first service from the first service provider device;
   an age of the first mesh network, wherein the age of the first mesh network comprises the time elapsed since the first provider device initially provided the first service;
   an available capacity of the first mesh network;
   whether the first mesh network supports connectivity through Internet Protocol version 6; and
   an expected performance when using the first mesh network.

11. The apparatus of claim 8, wherein the first message comprises a service advertisement message including an indication of at least one other service provided by the first service provider device.

12. The apparatus of claim 8, wherein the processor is further configured to:
   determine, based on the at least one characteristic of the paging window:
      a paging offset,
      a discovery window for the first communications channel,
      a location of the paging window, and a duration of the paging window; and
   scan for a second message on a second communications channel during the duration of the paging window.

13. The apparatus of claim 8, wherein the processor is further configured to transmit a service discovery request message for the service, and wherein the receiver is further configured to receive a service discovery response message.

14. The apparatus of claim 8, wherein the first characteristic includes a size of the first mesh network and the second characteristic includes a size of the second mesh network, and wherein the size of the first and second mesh networks includes a number of devices utilizing each respective mesh network to receive the first service.

15. An apparatus for communication in a neighbor aware network (NAN) comprising at least a first mesh network having at least a first multi-hop data path, comprising:
   means for receiving a first message of the NAN through a device utilizing the first multi-hop data path within the first mesh network;
   means for decoding the first message to determine:
      whether a first service provider device of the first mesh network provides a first service, a communication channel on which the first service is provided, and at least one characteristic of a paging window for the communication channel;
   means for establishing delivery of the service from the provider device based on the communication channel and the at least one characteristic of the paging window;
   means for decoding the first message to determine a first characteristic of the first mesh network;
   means for decoding a second received message to determine whether a second service provider device of a second mesh network is capable of providing the first service and a second characteristic of the second mesh network; and
   means for selecting either the first service provider device or the second service provider device for delivery of the service based on the first characteristic and the second characteristic for delivery of the service based on the first characteristic and the second characteristic, wherein the first or second characteristic includes an indication of an age of respectively the first or second mesh network, the indication of the age based on the time elapsed since a root device of each respective mesh network initially provided the first service.

16. The apparatus of claim 15, wherein the first characteristic includes a size of the first mesh network and the second characteristic includes a size of the second mesh network, and wherein the size of the first and second mesh networks includes a number of devices utilizing each respective mesh network to receive the first service.

17. A non-transitory computer readable storage medium comprising instructions that when executed cause a processor to perform a method of communication in a neighbor aware network (NAN) comprising at least a first mesh network having at least a first multi-hop data path, the method comprising:
- receiving a first message at a first device of the NAN through a device utilizing the first multi-hop data path within the first mesh network; and
- decoding the first message to determine:
  - whether a first service provider device of the first mesh network provides a first service,
  - a communication channel on which the first service is provided, and
  - at least one characteristic of a paging window for the communication channel; and
- establishing delivery of the service from the provider device based on the communication channel and the at least one characteristic of the paging window;
- decoding the first message to determine a first characteristic of the first mesh network;
- decoding a second received message to determine whether a second service provider device of a second mesh network is capable of providing the first service and to determine a second characteristic of the second mesh network; and
- selecting either the first service provider device or the second service provider device for delivery of the first service based on the first characteristic and the second characteristic, wherein the first or the second characteristic includes an indication of an age of respectively the first or second mesh network, the indication of the age based on the time elapsed since a root device of each respective mesh network initially provided the first service.

18. The computer readable storage medium of claim 17, wherein the first characteristic includes a size of the first mesh network and the second characteristic includes a size of the second mesh network, and wherein the size of the first and second mesh networks includes a number of devices utilizing each respective mesh network to receive the first service.

* * * * *